United States Patent
Iwamoto

(10) Patent No.: US 10,877,241 B2
(45) Date of Patent: Dec. 29, 2020

(54) ZOOM LENS AND IMAGE PICKUP APPARATUS

(71) Applicant: CANON KABUSHIKI KAISHA, Tokyo (JP)

(72) Inventor: Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 16/368,591

(22) Filed: Mar. 28, 2019

(65) Prior Publication Data

US 2019/0302404 A1 Oct. 3, 2019

(30) Foreign Application Priority Data

Apr. 2, 2018 (JP) ................. 2018-070653

(51) Int. Cl.
*G02B 9/12* (2006.01)
*G02B 7/04* (2006.01)
*G02B 13/06* (2006.01)
*G02B 13/02* (2006.01)

(52) U.S. Cl.
CPC ............... *G02B 9/12* (2013.01); *G02B 7/04* (2013.01); *G02B 13/02* (2013.01); *G02B 13/06* (2013.01)

(58) Field of Classification Search
CPC ...... G02B 13/0035; G02B 9/12; G02B 13/18; G02B 13/006; G02B 13/04

USPC ......................................................... 359/784
See application file for complete search history.

(56) References Cited

U.S. PATENT DOCUMENTS

| 2015/0350557 A1 | 12/2015 | Tanaka | |
|---|---|---|---|
| 2017/0059834 A1* | 3/2017 | Fujisaki | G02B 15/173 |
| 2018/0164558 A1* | 6/2018 | Saito | G02B 15/173 |
| 2020/0174234 A1* | 6/2020 | Katayose | G02B 15/20 |

FOREIGN PATENT DOCUMENTS

| JP | 2014-126851 A | 7/2014 |
|---|---|---|
| JP | 2014-199421 A | 10/2014 |
| JP | 2014-228721 A | 12/2014 |

* cited by examiner

*Primary Examiner* — Mohammed A Hasan
(74) *Attorney, Agent, or Firm* — Canon U.S.A., Inc. IP Division

(57) ABSTRACT

A zoom lens includes, in order from an object side: a positive first unit; a negative second unit; and a rear group. The rear group includes: a positive object-side unit, which is arranged closest to the object side; a negative rear-side unit, which is arranged closest to the image side in the zoom lens; and a negative middle unit, which is arranged adjacent to the rear-side unit and on the object side of the rear-side unit. The first unit, the middle unit, and the rear-side unit are configured to move toward the object side during zooming from a wide angle end. Further, focal lengths of the second unit and the middle unit, movement amounts of the middle unit, the rear-side unit, the object-side unit, and the first unit during zooming from the wide angle end to the telephoto end are each appropriately set.

16 Claims, 15 Drawing Sheets

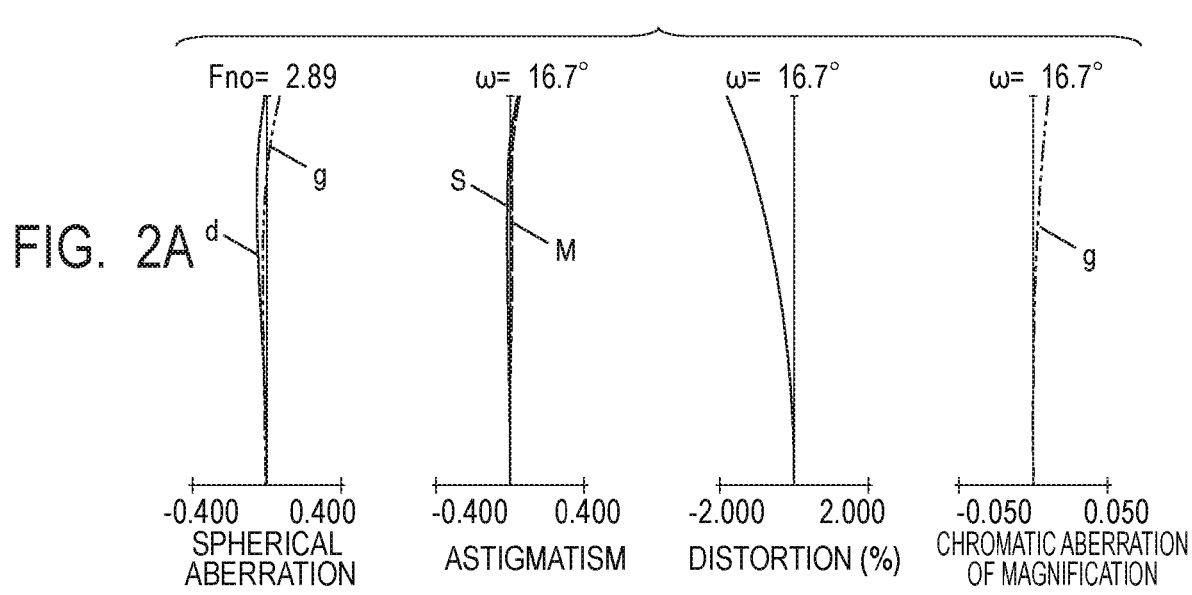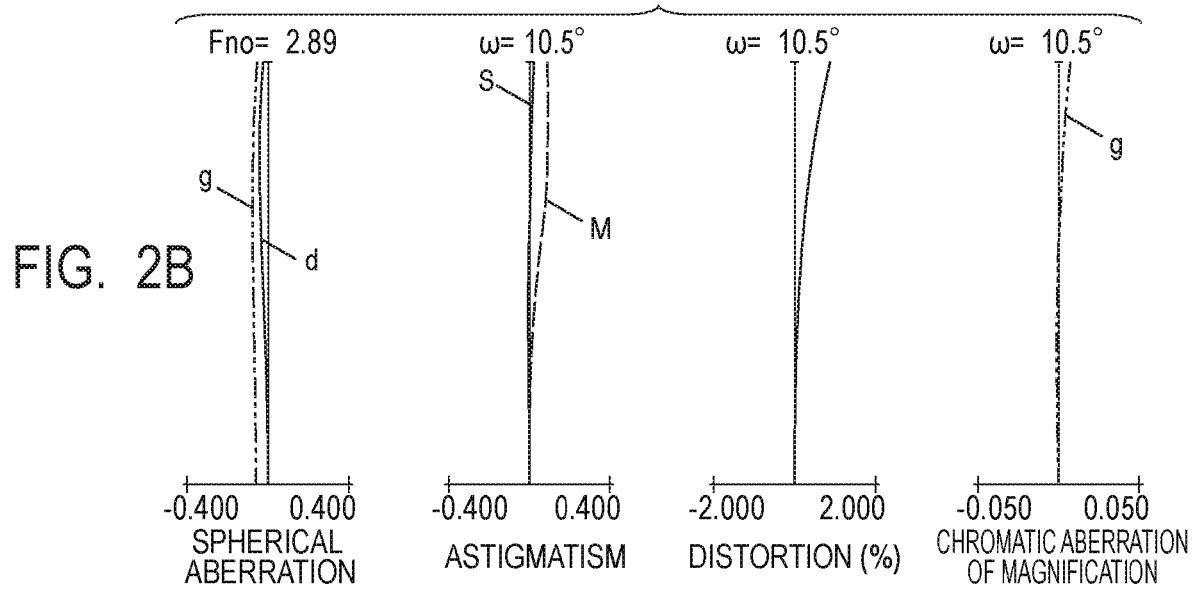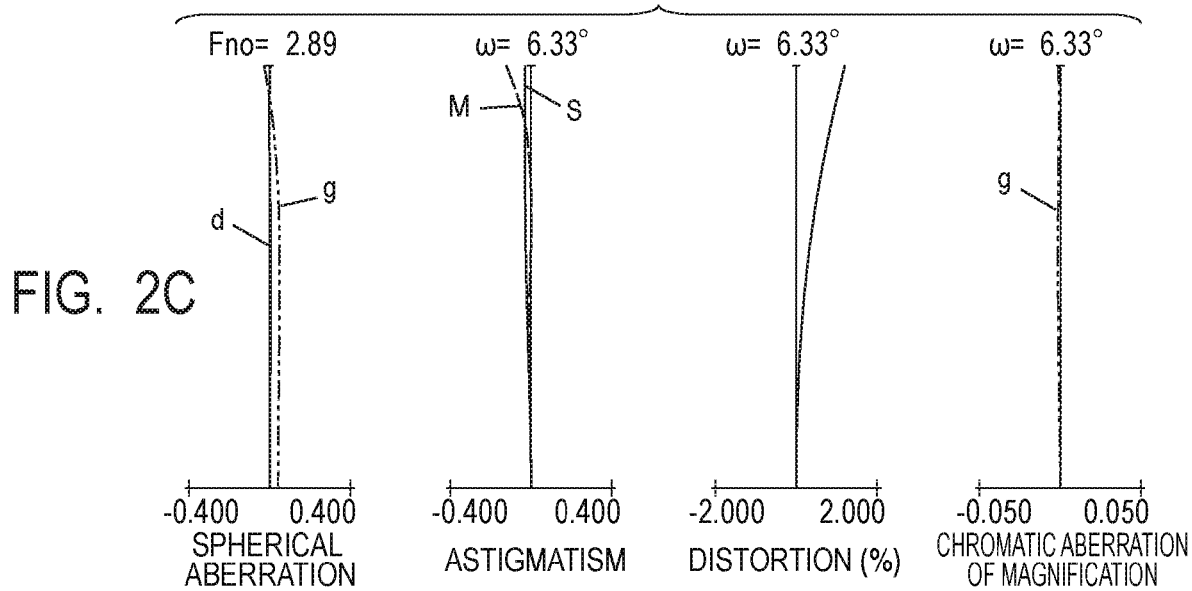

ZOOM LENS AND IMAGE PICKUP APPARATUS

BACKGROUND OF THE INVENTION

Field of the Invention

The aspect of the embodiments relates to a zoom lens and an image pickup apparatus.

Description of the Related Art

In recent years, an image pickup apparatus using an image pickup element has been downsized, and the number of pixels of the image pickup element used in the image pickup apparatus has been increasing.

An image pickup optical system used in such an image pickup apparatus is to have high optical performance and to have a small size of the entire system, for example. As a zoom lens satisfying those demands, there has been known a positive lead type zoom lens consisting of, in order from an object side to an image side, a first lens unit having a positive refractive power, a second lens unit having a negative refractive power, and a rear lens group including a plurality of lens units.

As such a positive lead type zoom lens, there has been known a compact zoom lens in which one or two lens units each having a negative refractive power are arranged closest to the image side in order to reduce a total length of the zoom lens. In U.S. Patent Application Publication No. 2015/0350557, there is disclosed a five-unit zoom lens consisting of, in order from an object side to an image side, first to fifth lens units having positive, negative, positive, negative, and negative refractive powers, respectively.

In the positive lead type zoom lens, it is relatively easy to increase an aperture ratio and increase a zoom ratio while downsizing the zoom lens. In the above-mentioned positive lead type zoom lens, in order to increase an aperture ratio while further downsizing the zoom lens, it is effective to arrange, on the image side, two lens units each having a negative refractive power, which are configured to move independently of each other during zooming.

However, when the two lens units each having a negative refractive power, which are configured to move independently of each other during zooming, are simply arranged on the image side, the zoom lens is upsized when the aperture ratio is increased. Further, variations of various aberrations accompanying zooming are increased, and it becomes difficult to obtain high resolution over the entire zoom range. In particular, when the aperture ratio is increased, it becomes extremely difficult to correct various aberrations with a small number of lenses. Therefore, in order to increase the aperture ratio while downsizing the zoom lens, it is important to appropriately set, for example, a refractive power and lens configuration of each lens unit included in the zoom lens.

SUMMARY OF THE INVENTION

According to one embodiment of the disclosure, there is provided a zoom lens including, in order from an object side to an image side: a first lens unit having a positive refractive power; a second lens unit having a negative refractive power; and a rear lens group, the zoom lens having a configuration in which an interval between each pair of adjacent lens units is changed during zooming, the rear lens group including: an object-side lens unit having a positive refractive power, which is arranged closest to the object side in the rear lens group; a rear-side lens unit having a negative refractive power, which is arranged closest to the image side in the zoom lens; and a middle lens unit having a negative refractive power, which is arranged adjacent to the rear-side lens unit and on the object side of the rear-side lens unit, the first lens unit, the middle lens unit, and the rear-side lens unit being configured to move toward the object side during zooming from a wide angle end to a telephoto end, in which conditional expressions:

$$0.50 < fn2/fn1 < 1.70;$$

$$1.01 < mn2/mn3 < 1.80; \text{ and}$$

$$-0.01 < mr1/mp1 < 0.30,$$

are satisfied where fn1 represents a focal length of the second lens unit, fn2 represents a focal length of the middle lens unit, mn2 represents a movement amount of the middle lens unit during zooming from the wide angle end to the telephoto end, mn3 represents a movement amount of the rear-side lens unit during zooming from the wide angle end to the telephoto end, mr1 represents a movement amount of the object-side lens unit during zooming from the wide angle end to the telephoto end, and mp1 represents a movement amount of the first lens unit during zooming from the wide angle end to the telephoto end.

Further features of the disclosure will become apparent from the following description of exemplary embodiments with reference to the attached drawings.

BRIEF DESCRIPTION OF THE DRAWINGS

FIG. 2A is an aberration diagram of the zoom lens according to Embodiment 1 at a wide angle end.

FIG. 2B is an aberration diagram of the zoom lens according to Embodiment 1 at an intermediate zoom position.

FIG. 2C is an aberration diagram of the zoom lens according to Embodiment 1 at a telephoto end.

DESCRIPTION OF THE EMBODIMENTS

Now, exemplary embodiments of the disclosure are described in detail with reference to the accompanying drawings. A zoom lens according to each Embodiment of the disclosure includes, in order from an object side to an image side, a lens unit LP1 (first lens unit) having a positive refractive power, a lens unit LN1 (second lens unit) having a negative refractive power, and a rear lens group including at least three lens units. An interval between each pair of lens units is changed during zooming.

Figure 1:
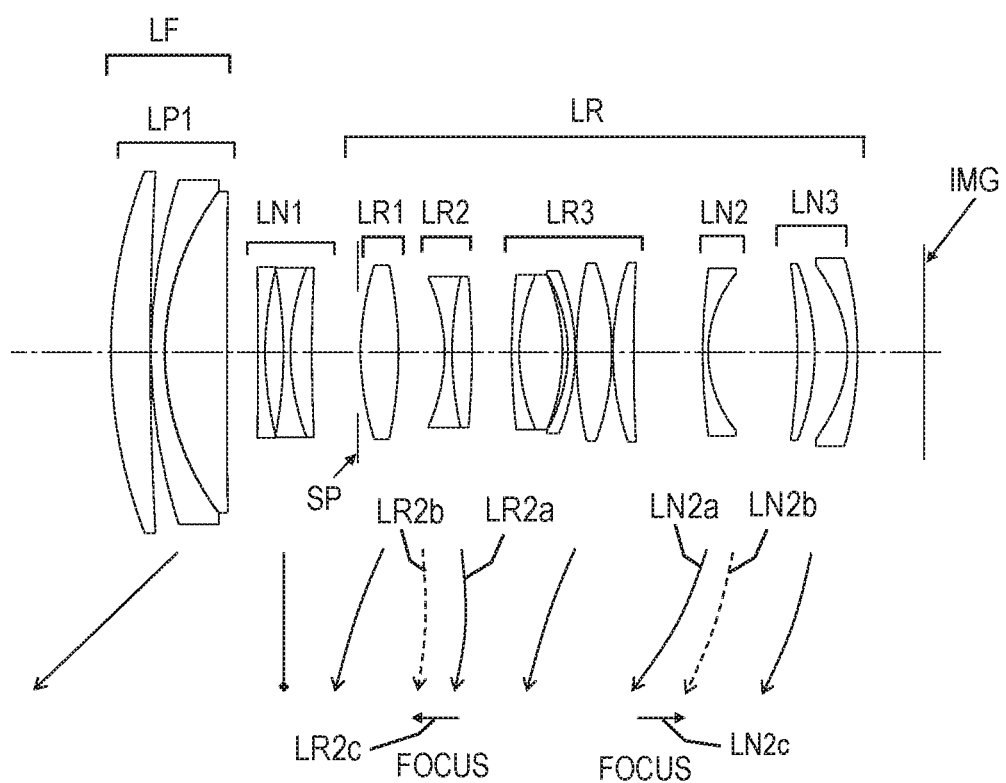
FIG. 1 is a lens cross-sectional view of a zoom lens according to Embodiment 1 of the disclosure.
Figure 3:
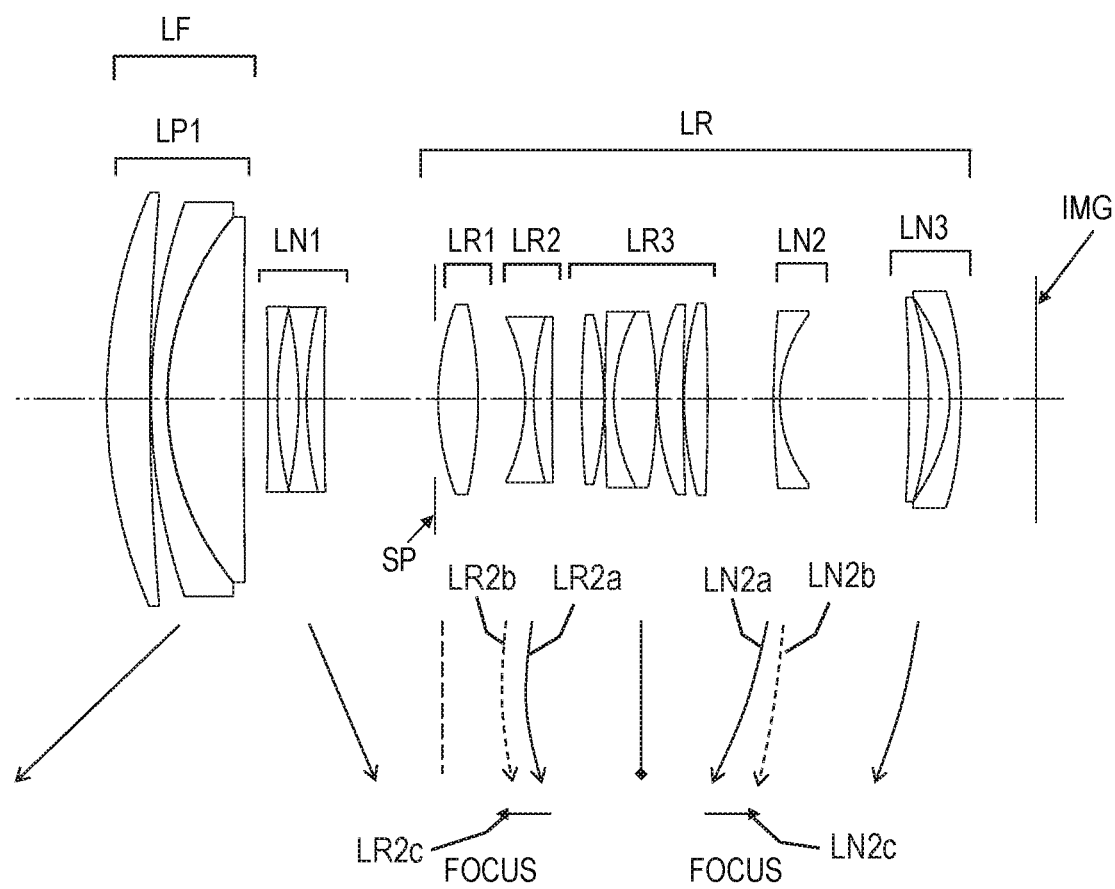
FIG. 3 is a lens cross-sectional view of a zoom lens according to Embodiment 2 of the disclosure.
Figure 4A:
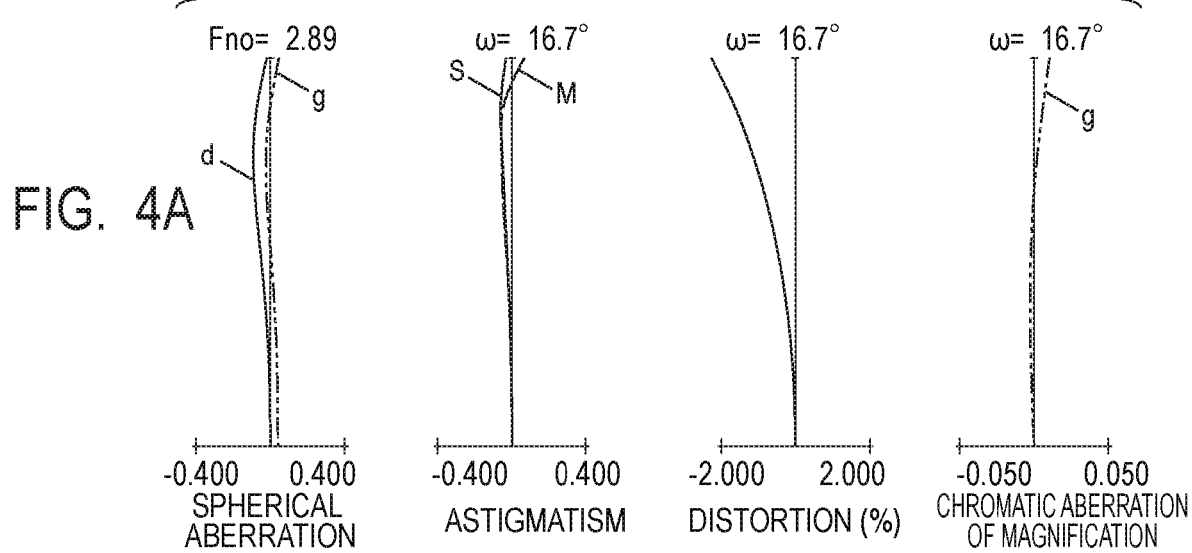
FIG. 4A is an aberration diagram of the zoom lens according to Embodiment 2 at the wide angle end.
Figure 4B:
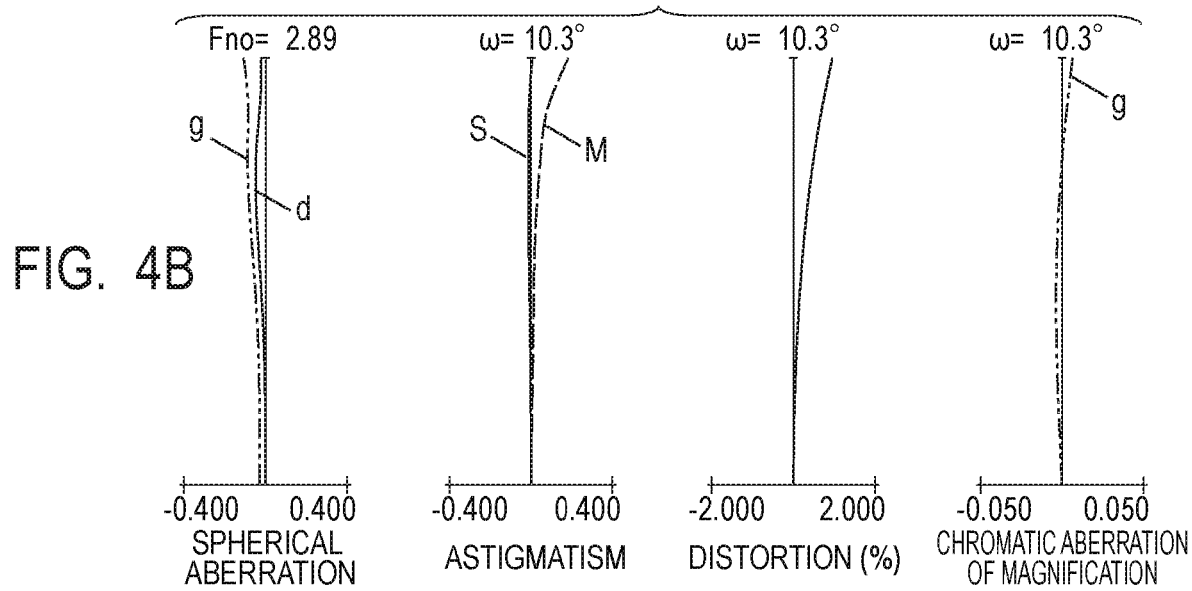
FIG. 4B is an aberration diagram of the zoom lens according to Embodiment 2 at the intermediate zoom position.
Figure 4C:
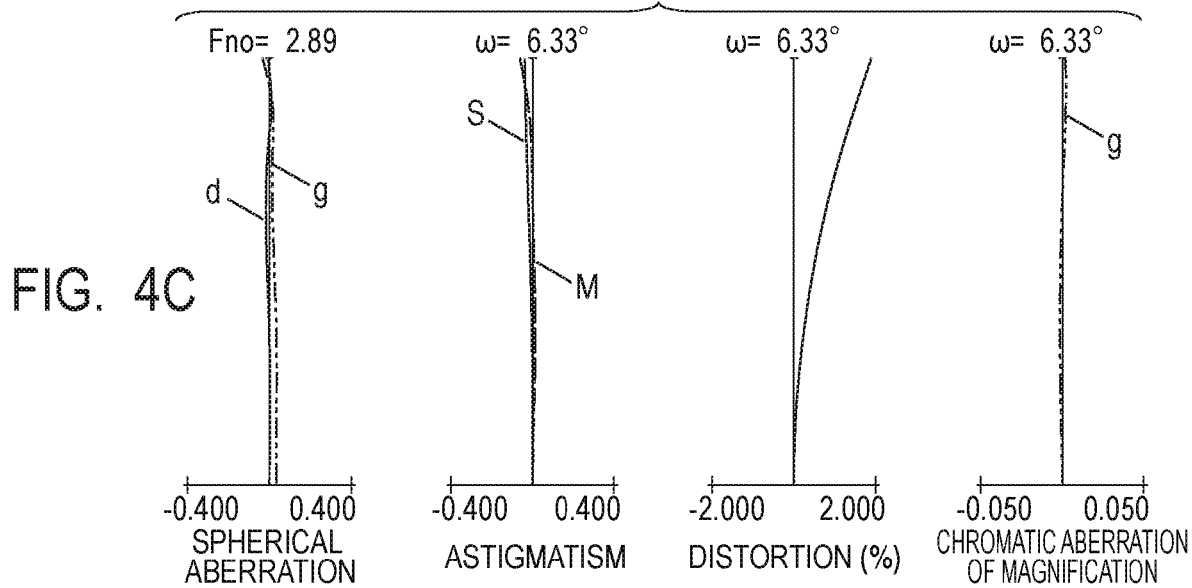
FIG. 4C is an aberration diagram of the zoom lens according to Embodiment 2 at the telephoto end.

FIG. 1 is a lens cross-sectional view of a zoom lens according to Embodiment 1 of the disclosure at a wide angle end (short focal length end). FIG. 2A, FIG. 2B, and FIG. 2C are aberration diagrams of the zoom lens according to Embodiment 1 at the wide angle end, an intermediate zoom position, and a telephoto end (long focal length end), respectively. The zoom lens according to Embodiment 1 has a zoom ratio of 2.70 and an F-number of 2.89. FIG. 3 is a lens cross-sectional view of a zoom lens according to Embodiment 2 of the disclosure at the wide angle end. FIG. 4A, FIG. 4B, and FIG. 4C are aberration diagrams of the zoom lens according to Embodiment 2 at the wide angle end, the intermediate zoom position, and the telephoto end, respectively. The zoom lens according to Embodiment 2 has a zoom ratio of 2.70 and an F-number of 2.89.

Figure 5:
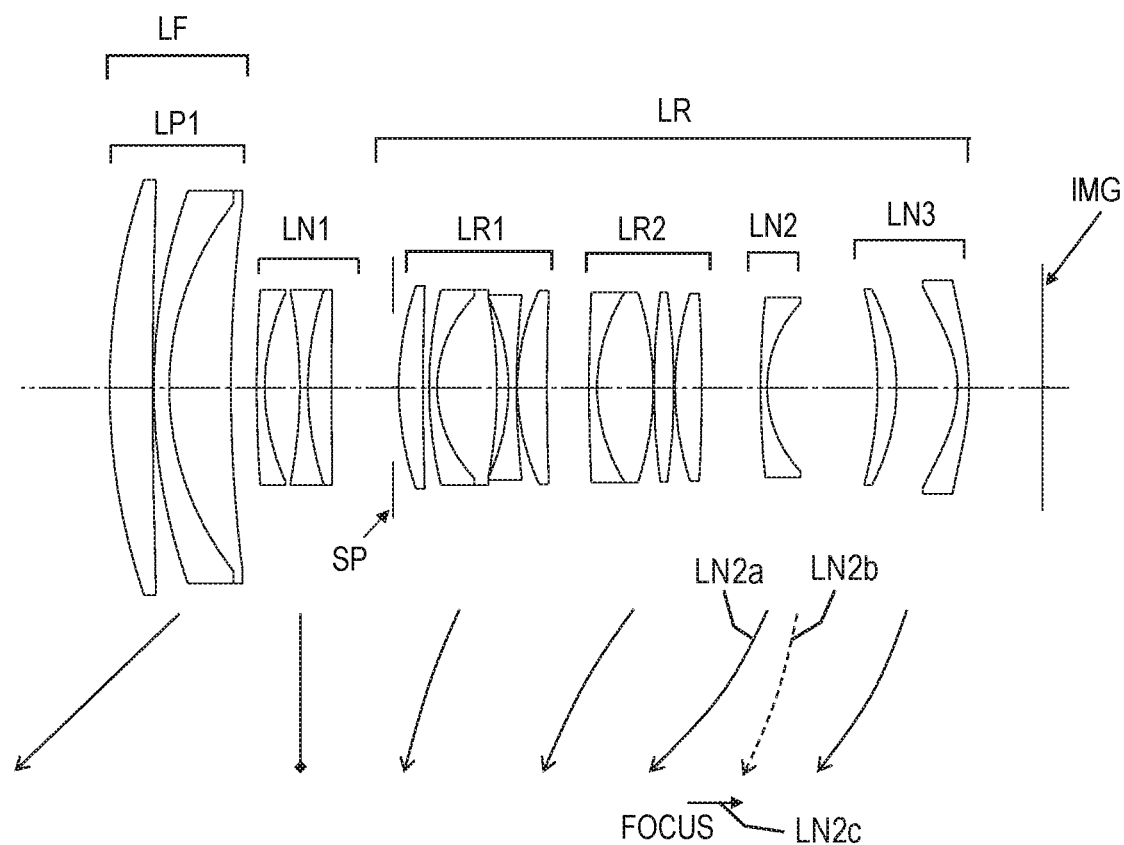
FIG. 5 is a lens cross-sectional view of a zoom lens according to Embodiment 3 of the disclosure.
Figure 6A:
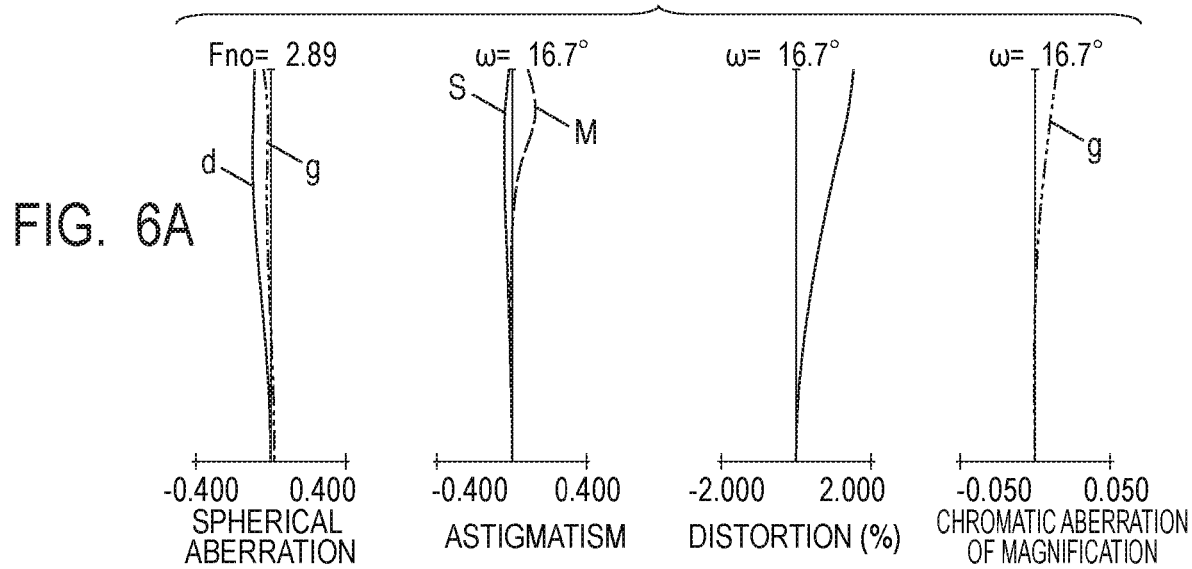
FIG. 6A is an aberration diagram of the zoom lens according to Embodiment 3 at the wide angle end.
Figure 6B:
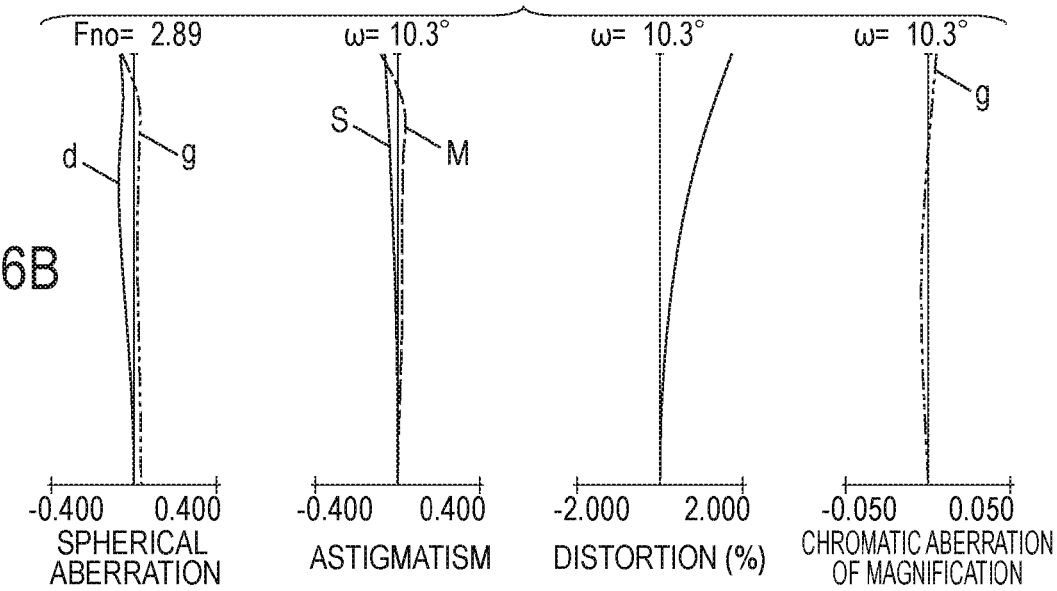
FIG. 6B is an aberration diagram of the zoom lens according to Embodiment 3 at the intermediate zoom position.
Figure 6C:
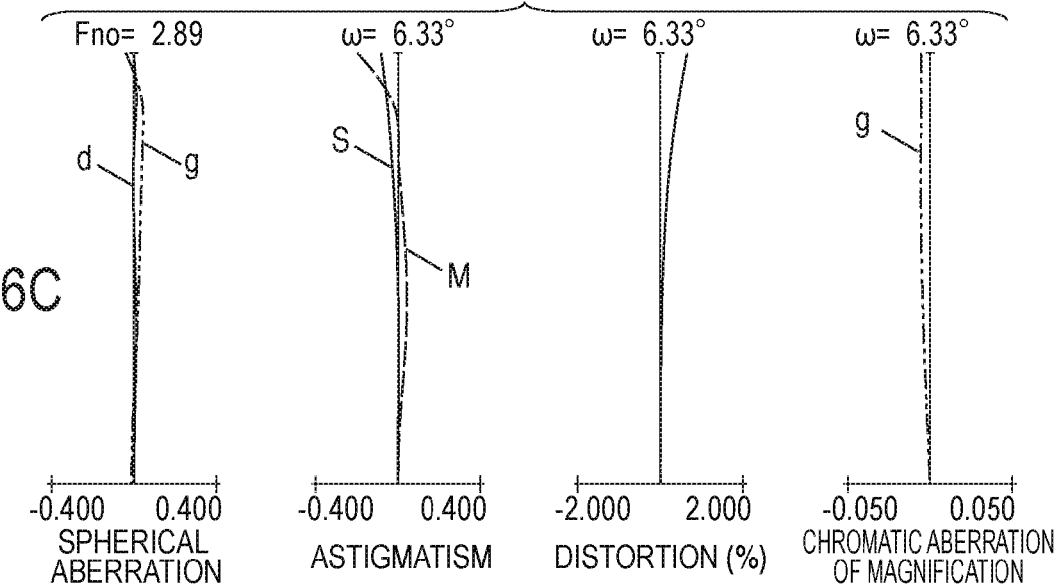
FIG. 6C is an aberration diagram of the zoom lens according to Embodiment 3 at the telephoto end.
Figure 7:
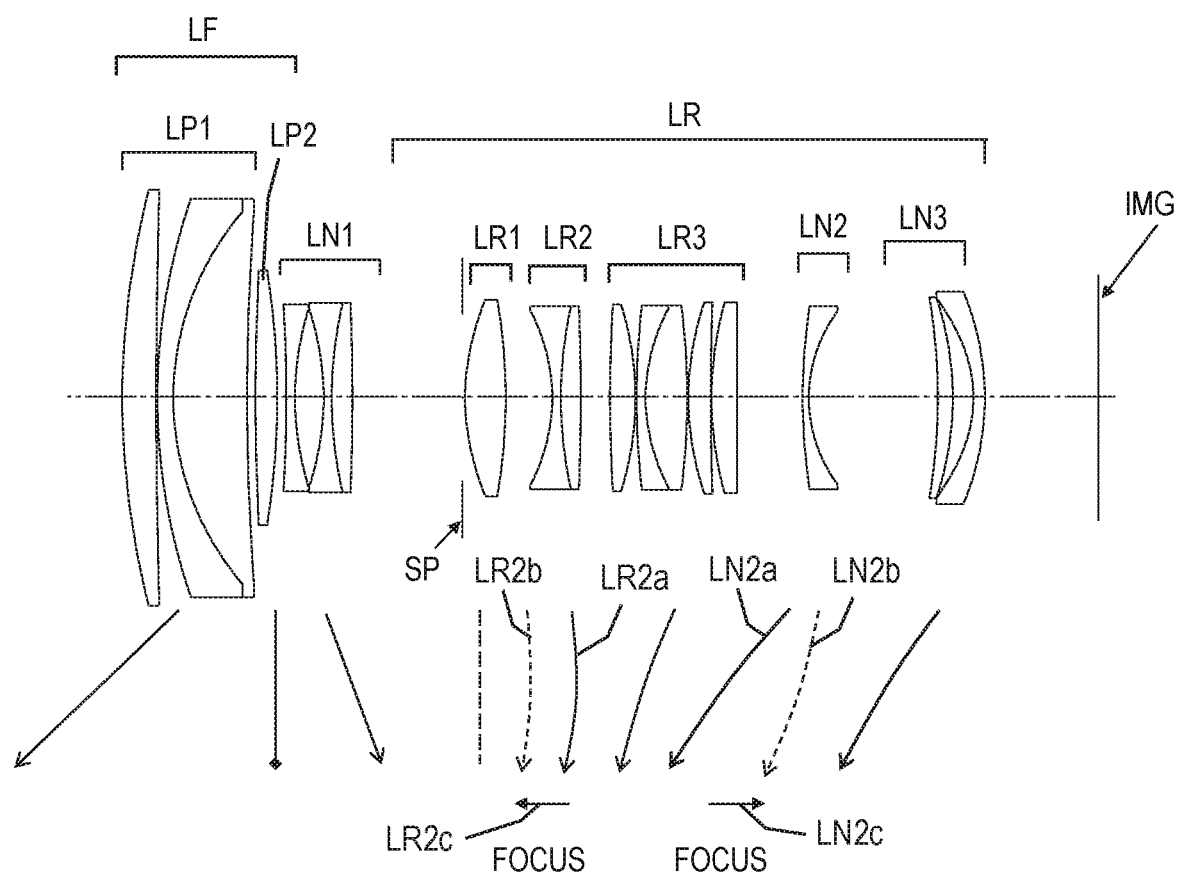
FIG. 7 is a lens cross-sectional view of a zoom lens according to Embodiment 4 of the disclosure.
Figure 8A:
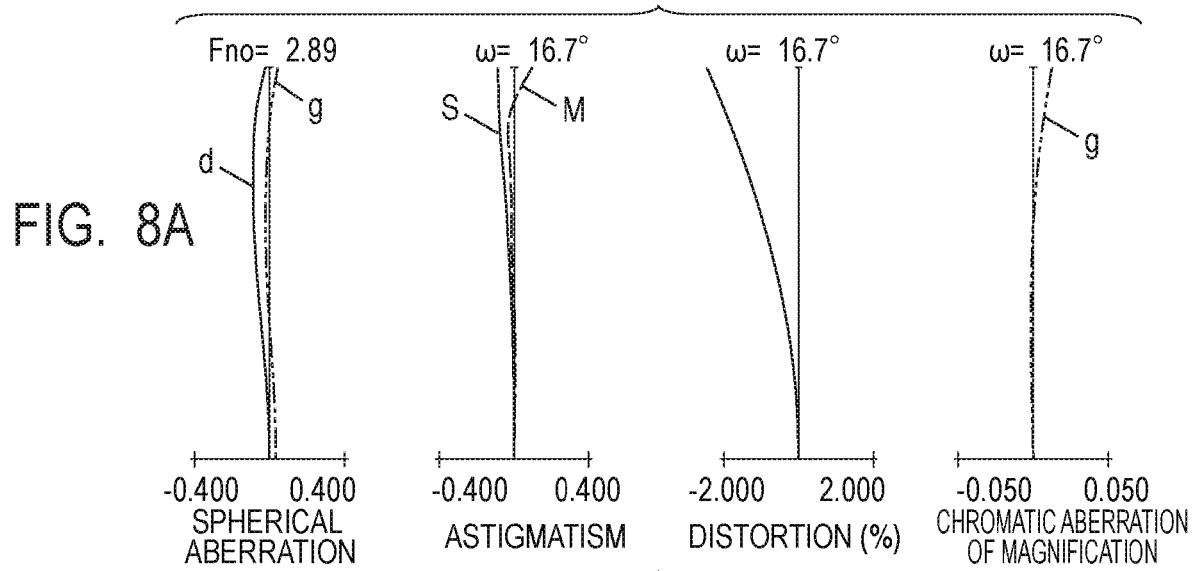
FIG. 8A is an aberration diagram of the zoom lens according to Embodiment 4 at the wide angle end.
Figure 8B:
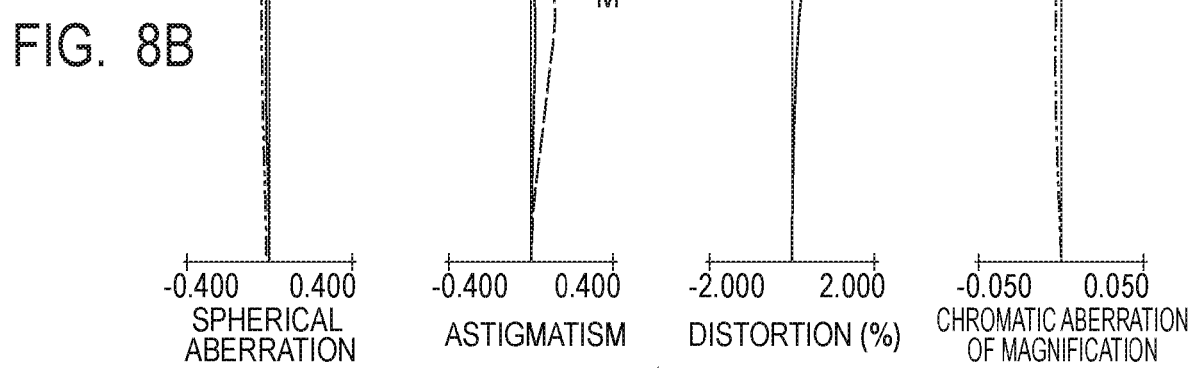
FIG. 8B is an aberration diagram of the zoom lens according to Embodiment 4 at the intermediate zoom position.
Figure 8C:
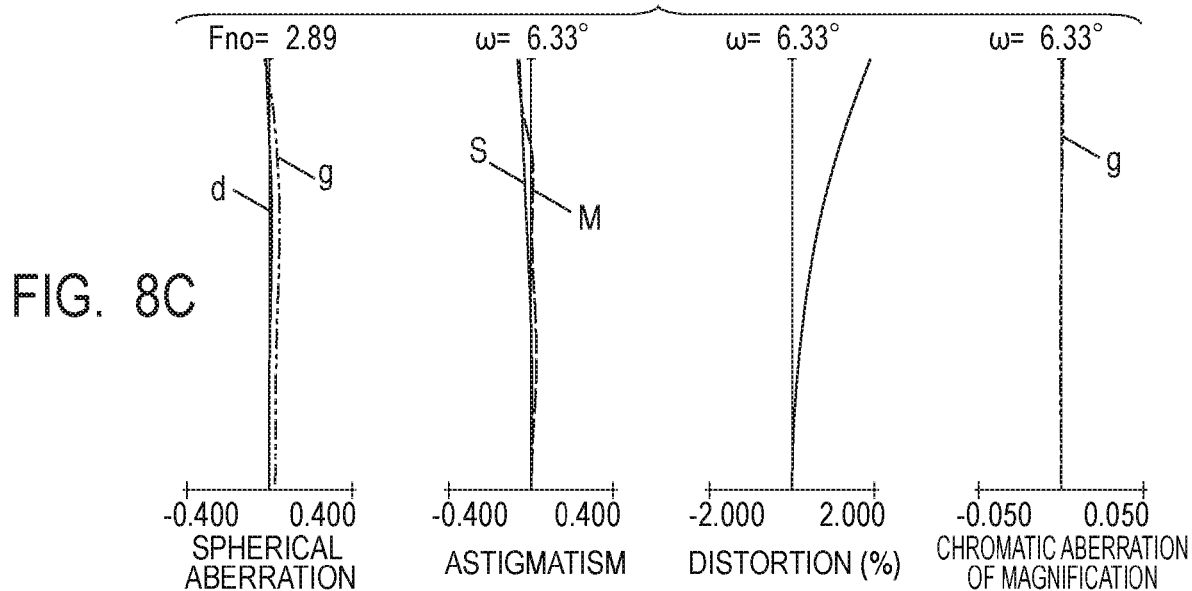
FIG. 8C is an aberration diagram of the zoom lens according to Embodiment 4 at the telephoto end.

FIG. 5 is a lens cross-sectional view of a zoom lens according to Embodiment 3 of the disclosure at the wide angle end. FIG. 6A, FIG. 6B, and FIG. 6C are aberration diagrams of the zoom lens according to Embodiment 3 at the wide angle end, the intermediate zoom position, and the telephoto end, respectively. The zoom lens according to Embodiment 3 has a zoom ratio of 2.70 and an F-number of 2.89. FIG. 7 is a lens cross-sectional view of a zoom lens according to Embodiment 4 of the disclosure at the wide angle end. FIG. 8A, FIG. 8B, and FIG. 8C are aberration diagrams of the zoom lens according to Embodiment 4 at the wide angle end, the intermediate zoom position, and the telephoto end, respectively. The zoom lens according to Embodiment 4 has a zoom ratio of 2.70 and an F-number of 2.89.

Figure 9:
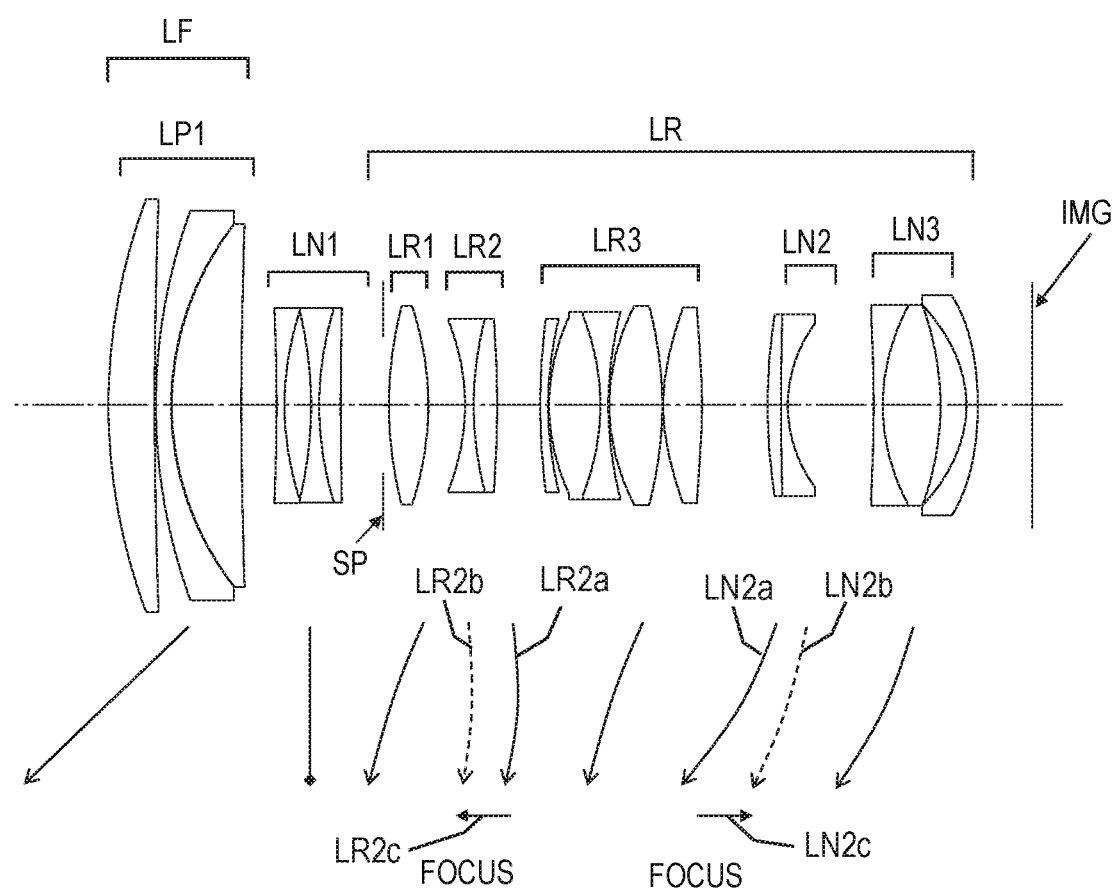
FIG. 9 is a lens cross-sectional view of a zoom lens according to Embodiment 5 of the disclosure.
Figure 10A:
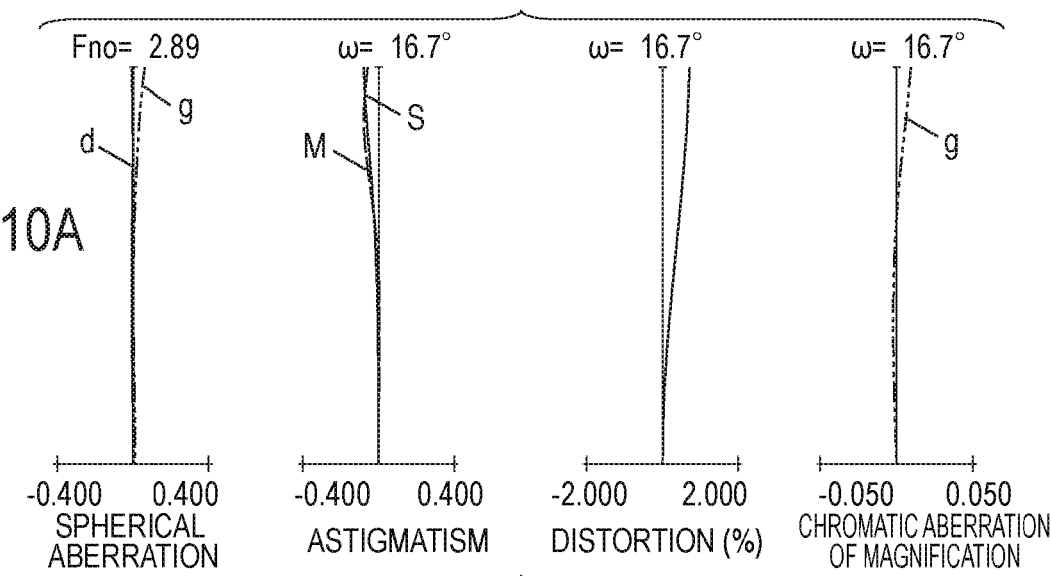
FIG. 10A is an aberration diagram of the zoom lens according to Embodiment 5 at the wide angle end.
Figure 10B:
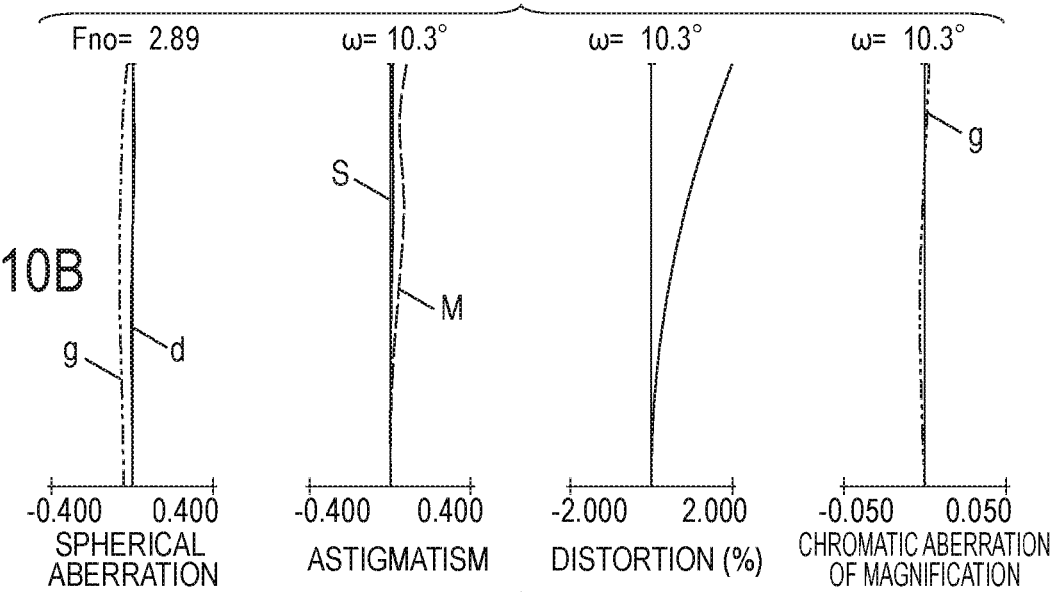
FIG. 10B is an aberration diagram of the zoom lens according to Embodiment 5 at the intermediate zoom position.
Figure 10C:
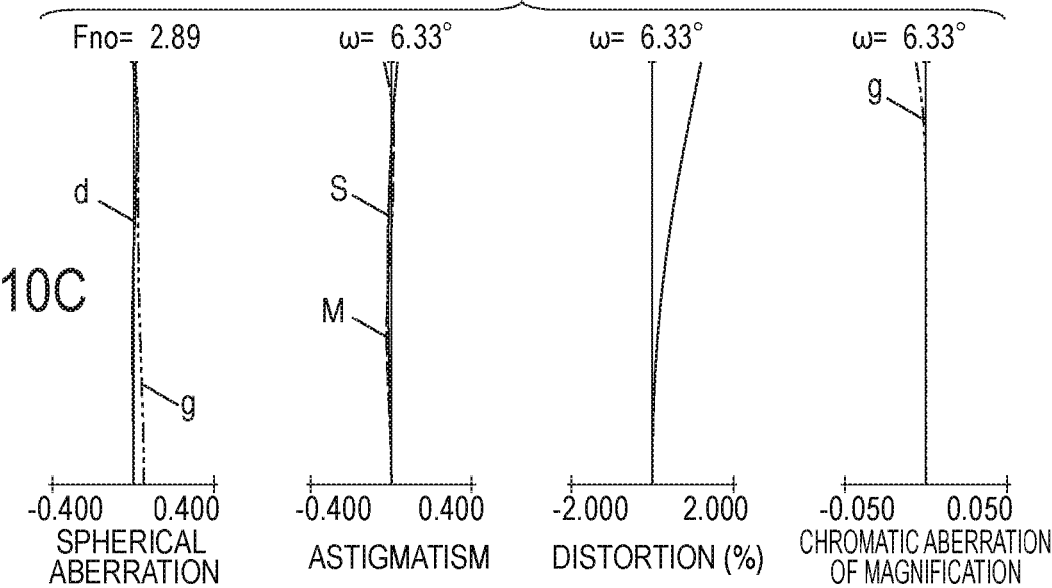
FIG. 10C is an aberration diagram of the zoom lens according to Embodiment 5 at the telephoto end.
Figure 11:
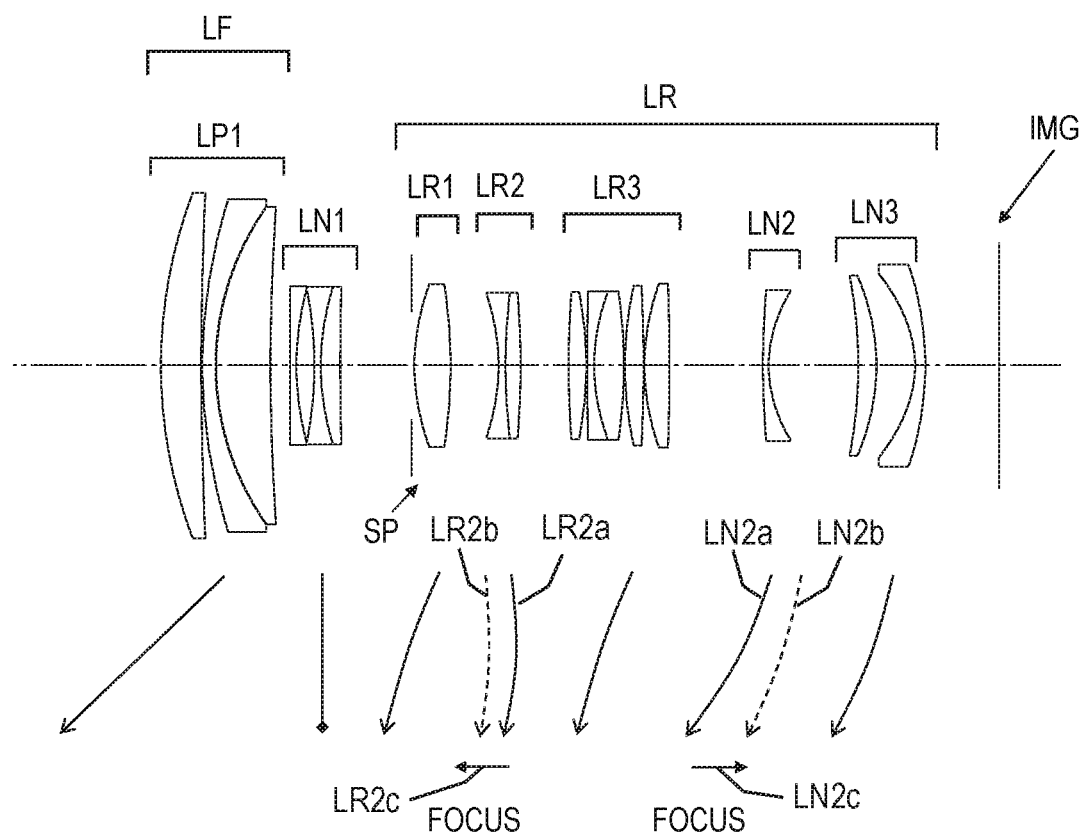
FIG. 11 is a lens cross-sectional view of a zoom lens according to Embodiment 6 of the disclosure.
Figure 12A:
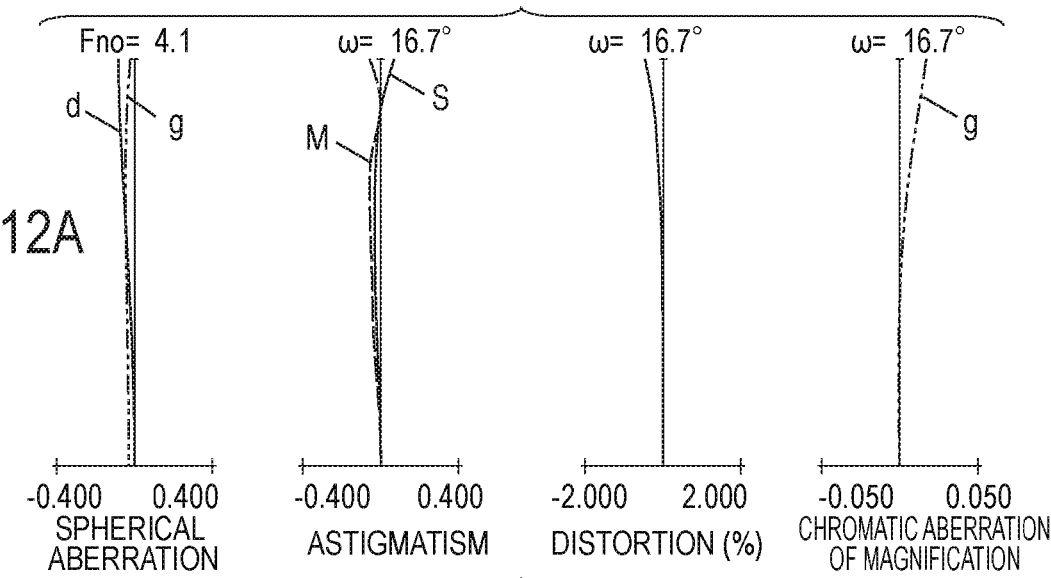
FIG. 12A is an aberration diagram of the zoom lens according to Embodiment 6 at the wide angle end.
Figure 12B:
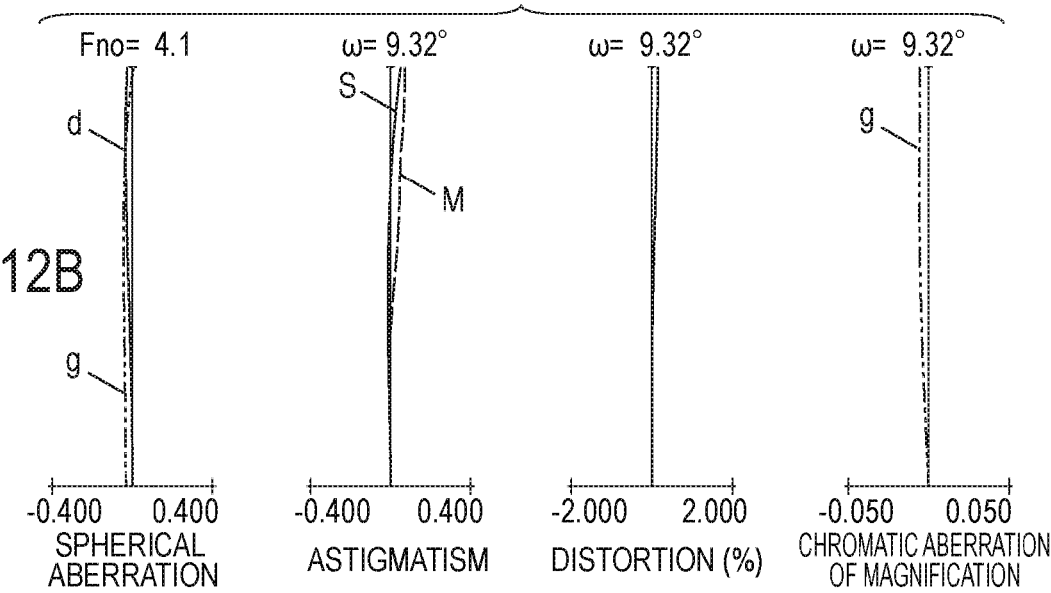
FIG. 12B is an aberration diagram of the zoom lens according to Embodiment 6 at the intermediate zoom position.
Figure 12C:
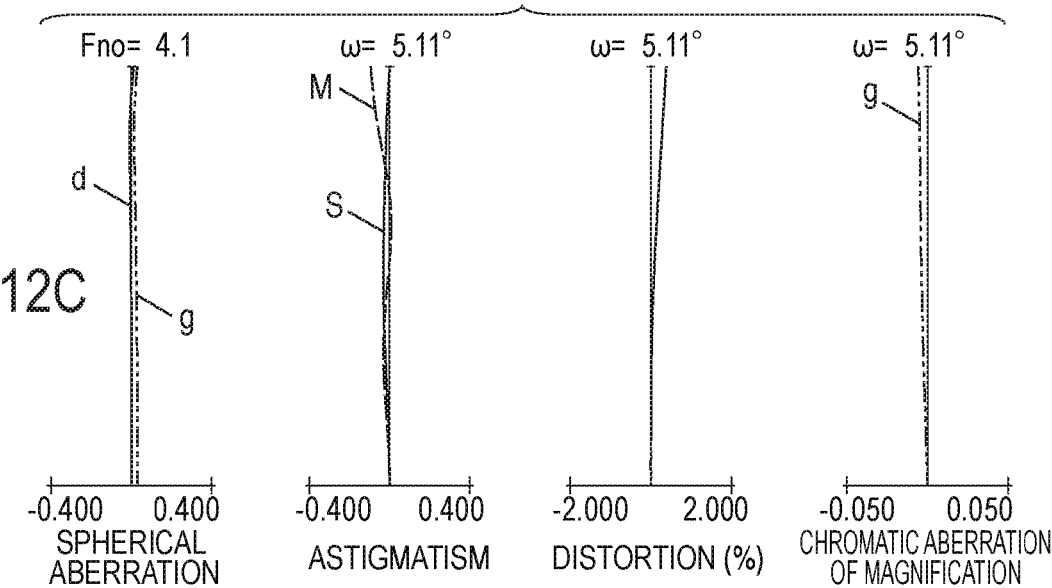
FIG. 12C is an aberration diagram of the zoom lens according to Embodiment 6 at the telephoto end.

FIG. 9 is a lens cross-sectional view of a zoom lens according to Embodiment 5 of the disclosure at the wide angle end. FIG. 10A, FIG. 10B, and FIG. 10C are aberration diagrams of the zoom lens according to Embodiment 5 at the wide angle end, the intermediate zoom position, and the telephoto end, respectively. The zoom lens according to Embodiment 5 has a zoom ratio of 2.70 and an F-number of 2.89. FIG. 11 is a lens cross-sectional view of a zoom lens according to Embodiment 6 of the disclosure at the wide angle end. FIG. 12A, FIG. 12B, and FIG. 12C are aberration diagrams of the zoom lens according to Embodiment 6 at the wide angle end, the intermediate zoom position, and the telephoto end, respectively. The zoom lens according to Embodiment 6 has a zoom ratio of 3.36 and an F-number of 4.10.

Figure 13:
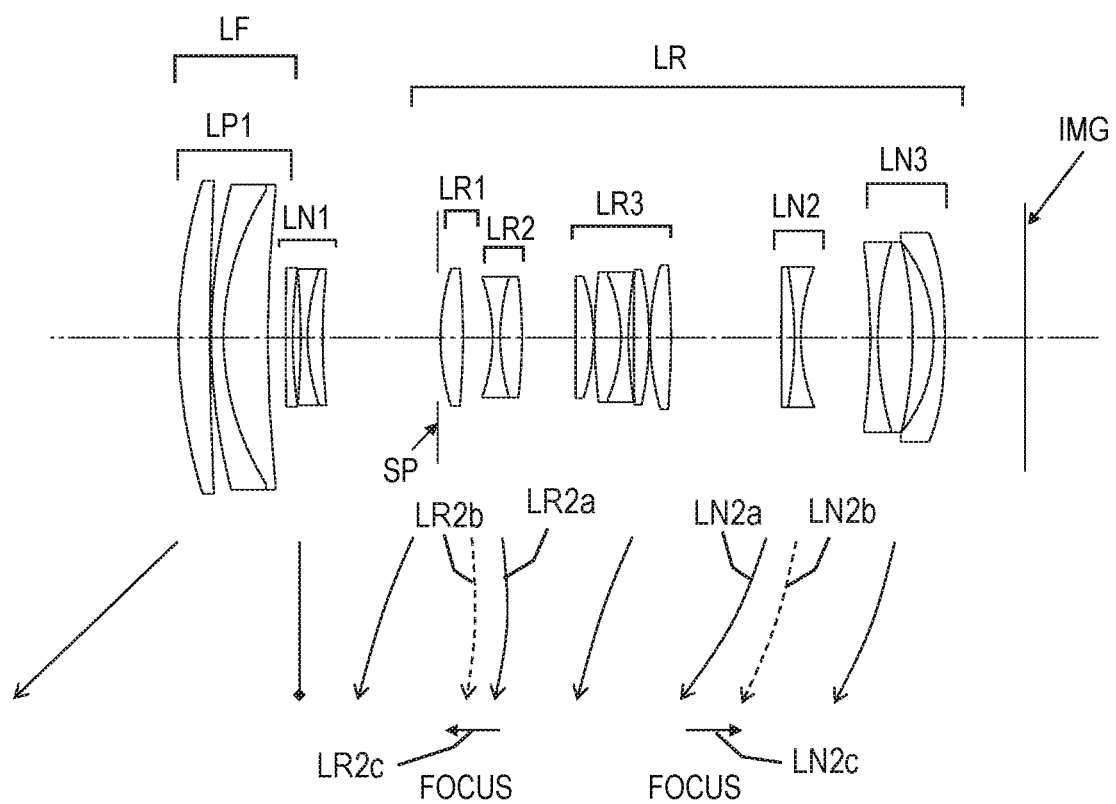
FIG. 13 is a lens cross-sectional view of a zoom lens according to Embodiment 7 of the disclosure.
Figure 14A:
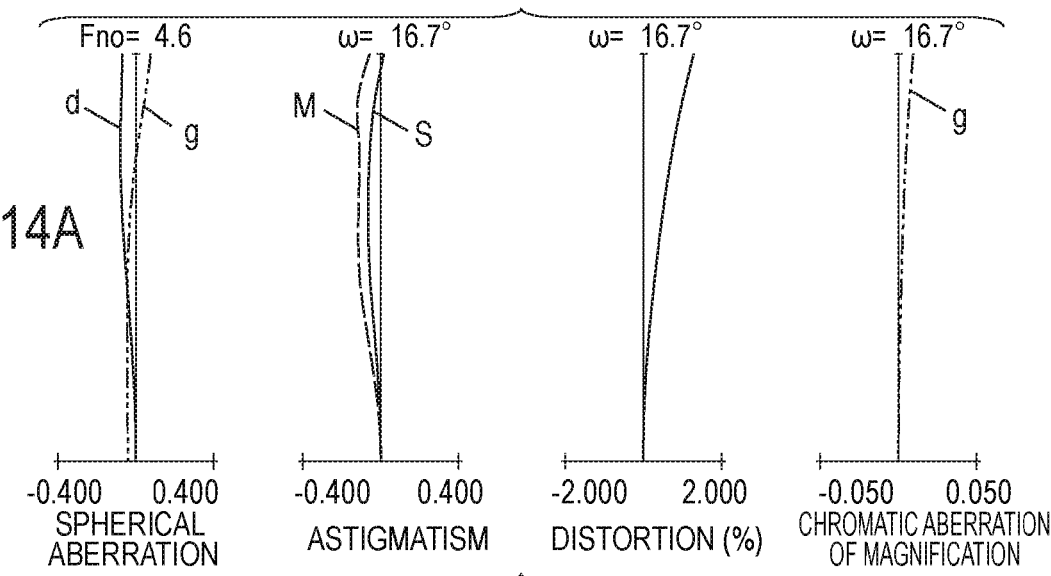
FIG. 14A is an aberration diagram of the zoom lens according to Embodiment 7 at the wide angle end.
Figure 14B:
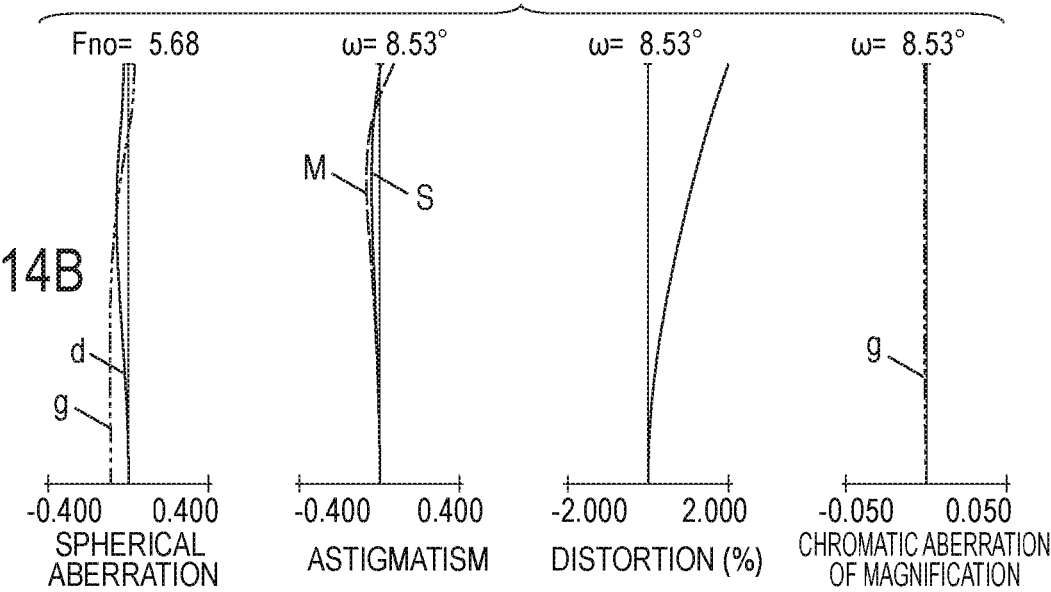
FIG. 14B is an aberration diagram of the zoom lens according to Embodiment 7 at the intermediate zoom position.
Figure 14C:
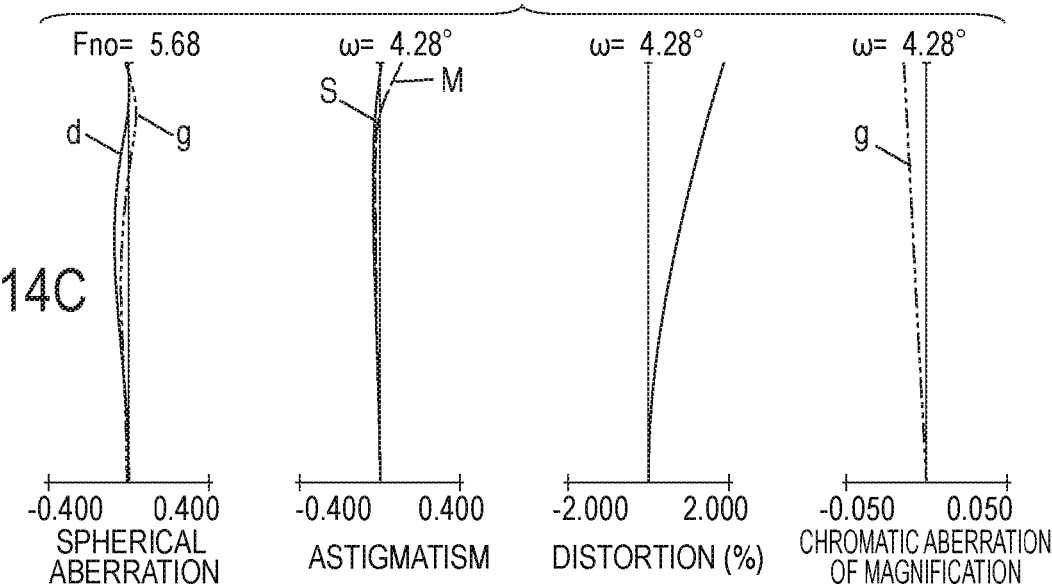
FIG. 14C is an aberration diagram of the zoom lens according to Embodiment 7 at the telephoto end.
Figure 15:
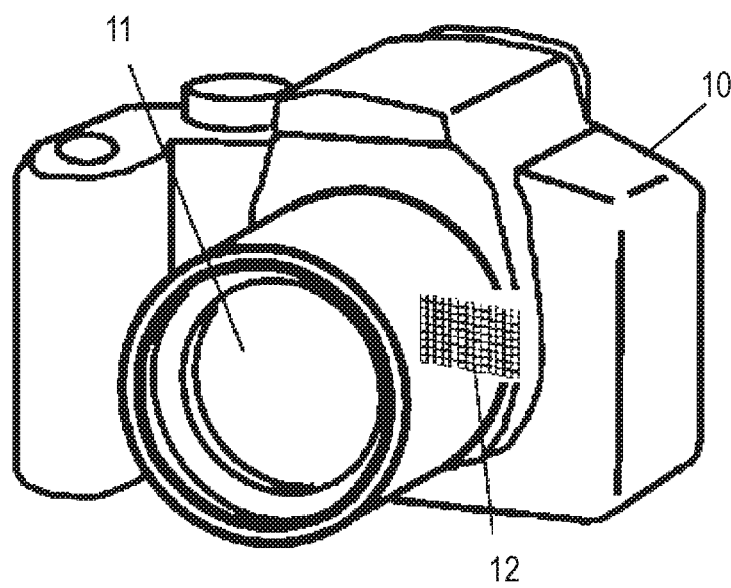
FIG. 15 is a schematic diagram of a main part of an image pickup apparatus according to one embodiment of the disclosure.

FIG. 13 is a lens cross-sectional view of a zoom lens according to Embodiment 7 of the disclosure at the wide angle end. FIG. 14A, FIG. 14B, and FIG. 14C are aberration diagrams of the zoom lens according to Embodiment 7 at the wide angle end, the intermediate zoom position, and the telephoto end, respectively. The zoom lens according to Embodiment 7 has a zoom ratio of 4.01 and an F-number of 4.60 to 5.88. FIG. 15 is a schematic diagram of a main part of an image pickup apparatus according to one embodiment of the disclosure.

The zoom lens according to each of Embodiments is an image pickup optical system used in a video camera, a digital camera, a TV camera, a monitoring camera, or other such image pickup apparatus. In the lens cross-sectional views, the left side is the object side (front side), and the right side is the image side (rear side).

In the lens cross-sectional views, a front lens group LF includes at least one lens unit including the lens unit LP1 having a positive refractive power, which is arranged closest to the object side in the zoom lens. The lens unit LN1 is a lens unit having a negative refractive power, which is arranged adjacent to the front lens group LF and on the image side of the front lens group LF. A rear lens group LR is a rear lens group that is arranged adjacent to the lens unit LN1 and includes at least three lens units. A lens LN3 (rear-side lens unit) is a lens unit having a negative refractive power, which is arranged closest to the image side among a plurality of lens units included in the zoom lens. A lens unit LN2 (middle lens unit) is a lens unit having a negative refractive power, which is arranged adjacent to the lens unit LN3 and on the object side of the lens unit LN3. A lens unit LR1 (object-side lens unit) is a lens unit having a positive refractive power, which is arranged closest to the object side in the rear lens group LR.

In the lens cross-sectional views, an aperture stop SP is arranged on the object side of the rear lens group LR. On an image plane IMG, when the zoom lens is used as an image pickup optical system of a video camera or a digital still camera, a solid-state image pickup element (photoelectric conversion element) such as a CCD sensor or a CMOS sensor is placed. Each of the arrows indicates a movement direction and movement locus of each lens unit during zooming (magnification varying) from the wide angle end to the telephoto end. The arrow regarding "focus" indicates a movement direction of the lens unit during focusing from infinity to close distance.

Regarding spherical aberration in the aberration diagrams, a solid line d-line indicates a d-line (wavelength: 587.6 nm), and a broken line g-line indicates a g-line (wavelength: 435.8 nm). In astigmatism diagrams, a broken line M indicates a meridional image plane of the d-line, and a solid line S indicates a sagittal image plane of the d-line. A g-line of chromatic aberration of magnification is a g-line with respect to a d-line. A symbol "ω" represents the half angle of view (value that is half of image pickup angle of view) (degrees), and Fno represents an F-number.

Hitherto, there has been known a zoom lens including, in order from an object side to an image side, a first lens unit having a positive refractive power, a second lens unit having a negative refractive power, and a rear lens group including a plurality of lens units and having a positive refractive power as a whole, in which a lens unit having a negative refractive power is arranged closest to the image side in the rear lens group. It has been known that such a zoom lens has a configuration beneficial in reducing the total length of the zoom lens as so-called a telephoto-type power arrangement by arranging the lens unit having a negative refractive power closest to the image side in the rear lens group.

There has also been known a zoom lens in which two lens units each having a negative refractive power are arranged on the image side in the rear lens group to reduce the total length of the zoom lens. Through arrangement of the plurality of lens units each having a negative refractive power on the image side in the rear lens group, it becomes easier to further reduce the total length of the zoom lens.

Meanwhile, when the plurality of lens units each having a negative refractive power are arranged on the image side, an axial ray diverges in the vicinity of the image plane, and hence a height of incidence of the axial ray passing through the vicinity of the aperture stop tends to become higher. As a result, it becomes difficult to correct spherical aberration and axial chromatic aberration, and it thus becomes difficult to increase an aperture ratio. In addition, a Petzval sum tends to be increased in the negative direction due to an increase in the number of lens units each having a negative refractive power. In this case, it becomes difficult to suitably correct field curvature, and it thus becomes difficult to increase the aperture ratio.

In order to solve the above-mentioned issues, it is important to, for example, appropriately set the number of lenses of each lens unit and a refractive power arrangement of each lens unit, and to set a movement amount of each lens unit during zooming.

In view of the above, each Embodiment adopts the following configuration. In each Embodiment, the lens unit LN3 having a negative refractive power is arranged closest to the image side among the plurality of lens units included in the rear lens group LR. The lens unit LN2 having a negative refractive power is arranged adjacent to the lens unit LN3 and on the object side of the lens unit LN3. The lens unit LR1 having a positive refractive power is arranged closest to the object side in the rear lens group LR. The lens unit LP1, the lens unit LN2, and the lens unit LN3 are configured to move toward the object side during zooming from the wide angle end to the telephoto end.

A movement amount of the lens unit LN2 during zooming from the wide angle end to the telephoto end is represented by mn2. A movement amount of the lens unit LN3 during zooming from the wide angle end to the telephoto end is represented by mn3. A movement amount of the lens unit LP1 during zooming from the wide angle end to the telephoto end is represented by mp1. A movement amount of the lens unit LR1 during zooming from the wide angle end to the telephoto end is represented by mr1. A focal length of the lens unit LN1 is represented by fn1. A focal length of the lens unit LN2 is represented by fn2.

At this time, the following conditional expressions are satisfied:

$$0.50 < fn2/fn1 < 1.70 \quad (1);$$

$$1.01 < mn2/mn3 < 1.80 \quad (2); \text{ and}$$

$$-0.01 < mr1/mp1 < 0.30 \quad (3).$$

The "movement amount of a lens unit" as used herein refers to a difference between a position of the lens unit on the optical axis at the wide angle end and a position of the lens unit on the optical axis at the telephoto end. A sign of the movement amount is positive when the lens unit is located on the object side, and is negative when the lens unit is located on the image side at the telephoto end as compared to the wide angle end.

In each Embodiment, through arrangement of the plurality of lens units each having a negative refractive power on the image side, it becomes easier to reduce the total length of the zoom lens. Through movement of the lens unit LP1 and the lens unit LN2 toward the object side during zooming from the wide angle end to the telephoto end, the total length of the zoom lens is reduced, and a high zoom ratio is secured. Further, through monotonous movement of the lens unit LN3 toward the object side, a variation of astigmatism accompanying zooming is suitably corrected to facilitate an increase of the aperture ratio, and a mechanical structure is simplified to facilitate downsizing of the zoom lens.

Next, a technical meaning of each of the conditional expressions given above is described. The conditional expression (1) defines a ratio of the focal length of the lens unit LN2 to the focal length of the lens unit LN1. The lens unit LN1 is a magnification-varying lens unit, and the lens unit LN2 is a lens unit arranged on the image side in the rear lens group LR, and through appropriate setting of the ratio between the focal lengths of those lens units, the total length of the zoom lens is reduced, and image quality is increased.

When the ratio of the conditional expression (1) exceeds the upper limit of the conditional expression (1) and the negative focal length of the lens unit LN2 becomes longer (when the absolute value of the negative focal length becomes larger), it becomes difficult to achieve a telephoto-type power arrangement, and it thus becomes difficult to reduce the total length of the zoom lens. When the ratio of the conditional expression (1) falls below the lower limit of the conditional expression (1) and the negative focal length of the lens unit LN2 becomes shorter (when the absolute value of the negative focal length becomes smaller), a Petzval sum is increased in the negative direction, and it becomes difficult to correct field curvature.

The conditional expression (2) defines a ratio of the movement amount of the lens unit LN2 to the movement amount of the lens unit LN3 during zooming from the wide angle end to the telephoto end. The movement amount of the lens unit LN2 is set to be larger than the movement amount of the lens unit LN3, and thus contribution of the lens unit LN2 to magnification varying is increased to facilitate an increase of the zoom ratio. Further, the interval between the lens unit LN2 and the lens unit LN3 is set to be larger at the wide angle end than at the telephoto end, and thus a variation of astigmatism accompanying zooming is suitably corrected.

When the ratio of the conditional expression (2) exceeds the upper limit of the conditional expression (2) and the movement amount of the lens unit LN2 becomes larger, a mechanical mechanism is complicated, and the zoom lens is disadvantageously upsized. When the ratio of the conditional expression (2) falls below the lower limit of the conditional expression (2) and the movement amount of the conditional expression (2) becomes smaller, the contribution of the lens unit LN2 to magnification varying is decreased, and it becomes disadvantageously difficult to increase the zoom ratio.

The conditional expression (3) defines a ratio the movement amount of the lens unit LR1 to the movement amount of the lens unit LP1 during zooming from the wide angle end to the telephoto end. The movement amount of the lens unit LP1 is set to be larger than the movement amount of the lens unit LR1, and thus it becomes easier to increase the aperture ratio and increase the zoom ratio. When the ratio of the conditional expression (3) exceeds the upper limit thereof and the movement amount of the lens unit LR1 becomes larger, a height of incidence of a ray entering a lens in the vicinity of the aperture stop SP at the telephoto end becomes higher. In this case, it becomes difficult to correct spherical aberration and axial chromatic aberration, and it thus becomes difficult to increase the aperture ratio.

When the ratio of the conditional expression (3) falls below the lower limit of the conditional expression (3) and the movement amount of the lens unit LP1 becomes larger, an entrance pupil position becomes farther from the first lens surface at the telephoto end. Therefore, it becomes difficult to secure a sufficient peripheral light amount unless a front lens effective diameter is increased, and it thus becomes difficult to downsize the zoom lens and increase the zoom ratio.

In each Embodiment, at least one of the following conditional expressions is satisfied. A focal length of (entire system of) the zoom lens at the telephoto end is represented by "ft". A back focus at the wide angle end is represented by "skw", and a back focus at the telephoto end is represented by "skt". A focal length of the zoom lens at the wide angle end is represented by "fw". A lateral magnification of the lens unit LN1 at the telephoto end is represented by βLN1t. A focal length of the lens unit LN3 is represented by fn3.

At this time, one or more of the following conditional expressions is satisfied:

$$0.15 < mp1/ft < 0.40 \quad (4);$$

$$0.50 < skt/skw < 4.00 \quad (5);$$

$$-0.60 < fn1/ft < -0.20 \quad (6);$$

$$0.10 < skw/fw < 0.42 \quad (7);$$

$$-5.00 < \beta LN1t < -1.00 \quad (8); \text{ and}$$

$$0.05 < fn2/fn3 < 0.40 \quad (9).$$

Next, a technical meaning of each of the conditional expressions given above is described. The conditional expression (4) defines a ratio of the movement amount of the lens unit LP1 during zooming from the wide angle end to the telephoto end to the focal length of the zoom lens at the telephoto end. When the ratio of the conditional expression (4) falls below the lower limit of the conditional expression (4) and the movement amount of the lens unit LP1 becomes smaller, it becomes disadvantageously difficult to correct chromatic aberration of magnification at the telephoto end. When the ratio of the conditional expression (4) exceeds the upper limit of the conditional expression (4) and the movement amount of the lens unit LP1 becomes larger, the mechanical mechanism is complicated, and the zoom lens is disadvantageously upsized.

The conditional expression (5) defines a ratio of the back focus at the telephoto end to the back focus at the wide angle end. Through appropriate setting of the ratio of the back focus at the telephoto end to the back focus at the wide angle end, it becomes easier to achieve high image quality and downsize the zoom lens by canceling out an amount of aberration generated in the lens unit LN3 and an amount of aberration generated in the lens unit LP1.

When the ratio of the conditional expression (5) exceeds the upper limit of the conditional expression (5) and the back focus at the wide angle end becomes too shorter, the amount of chromatic aberration of magnification generated in the lens unit LN3 becomes smaller at the wide angle end, and correction of chromatic aberration of magnification becomes disadvantageously insufficient. When the ratio of the conditional expression (5) falls below the lower limit of the conditional expression (5) and the back focus at the wide angle end becomes too longer, a variation of chromatic aberration of magnification accompanying zooming becomes disadvantageously larger.

The conditional expression (6) defines a ratio of the focal length of the lens unit LN1 to the focal length of the zoom lens at the telephoto end. When the ratio of the conditional expression (6) falls below the lower limit of the conditional expression (6) and the negative focal length of the lens unit LN1 becomes longer, the movement amount of each lens unit required for magnification varying becomes larger, and the zoom lens is disadvantageously upsized. When the ratio of the conditional expression (6) exceeds the upper limit of the conditional expression (6) and the negative focal length of the lens unit LN1 becomes shorter, variations of spherical aberration and comatic aberration accompanying zooming become disadvantageously larger.

The conditional expression (7) defines a ratio of the back focus at the wide angle end to the focal length of the zoom lens at the wide angle end. When the ratio of the conditional expression (7) exceeds the upper limit of the conditional expression (7) and the back focus becomes longer, the total length of the zoom lens becomes disadvantageously longer. When the ratio of the conditional expression (7) falls below the lower limit of the conditional expression (7) and the back focus becomes shorter, a rear lens effective diameter of the lens becomes larger, and the zoom lens is disadvantageously upsized.

The conditional expression (8) defines the lateral magnification of the lens unit LN1 at the telephoto end. When the lateral magnification exceeds the upper limit of the conditional expression (8) and the lateral magnification becomes larger, that is, an absolute value thereof becomes smaller, it becomes difficult to obtain a sufficient magnification-varying ratio in the lens unit LN1, and it thus becomes difficult to increase the zoom ratio. When the lateral magnification falls below the lower limit of the conditional expression (8) and the lateral magnification becomes smaller, that is, the absolute value thereof becomes larger, the contribution of the lens unit LN1 to magnification varying becomes larger, and variations of spherical aberration and comatic aberration accompanying zooming become disadvantageously larger.

The conditional expression (9) defines a ratio of the focal length of the lens unit LN2 to the focal length of the lens unit LN3. When the ratio of the conditional expression (9) falls below the lower limit of the conditional expression (9) and the negative focal length of the lens unit LN3 becomes longer or the negative focal length of the lens unit LN2 becomes shorter, asymmetricity in a power arrangement becomes stronger, and it becomes disadvantageously difficult to correct comatic aberration and distortion particularly at the telephoto end. When the ratio of the conditional expression (9) exceeds the upper limit of the conditional expression (9) and the negative focal length of the lens unit LN3 becomes shorter or the negative focal length of the lens unit LN2 becomes longer, it becomes difficult to achieve a telephoto-type power arrangement, and the total length of the zoom lens becomes disadvantageously longer.

Further, in one embodiment, the following conditional expressions are satisfied.

$$0.60 < fn2/fn1 < 1.60 \quad (1a);$$

$$1.03 < mn2/mn3 < 1.61 \quad (2a);$$

$$-0.005 < mr/mp1 < 0.280 \quad (3a);$$

$$0.20 < mp1/ft < 0.36 \quad (4a);$$

$$1.20 < skt/skw < 3.40 \quad (5a);$$

$$-0.50 < fn1/ft < -0.25 \quad (6a);$$

$$0.12 < skw/fw < 0.30 \quad (7a);$$

$$-4.20 < \beta LN1t < -1.50 \quad (8a); \text{ and}$$

$$0.08 < fn2/fn3 < 0.31 \quad (9a).$$

Next, a lens configuration in each Embodiment is described. In each Embodiment, the rear lens group LR is arranged adjacent to the lens unit LN1 and on the image side of the lens unit LN1, and includes the aperture stop SP. Further, the lens unit LP1 is arranged closest to the object side in the zoom lens.

In the lens cross-sectional views in Embodiments 1, 2, and 5 to 7, the front lens group LF consists of a lens unit LP1 having a positive refractive power. The zoom lens includes a lens unit LN1 having a negative refractive power, and a rear lens group LR. The rear lens group LR consists of, in order from the object side to the image side, a lens unit LR1 having a positive refractive power, a lens unit LR2 having a negative refractive power, a lens unit LR3 having a positive refractive power, a lens unit LN2 having a negative refractive power, and a lens unit LN3 having a negative refractive power. The zoom lens according to each of Embodiments 1, 2, and 5 to 7 is a seven-unit zoom lens. In Embodiments 1 and 5 to 7, all the lens units are configured to move during zooming.

In Embodiment 2, the lens unit LR1 is configured not to move during zooming, and the other lens units are configured to move during zooming. In Embodiments 1, 2, and 5 to 7, the lens unit LR2 is configured to move toward the object side and the lens unit LN2 is configured to move toward the image side during focusing from infinity to close distance. A solid arrow LR2a and a dotted arrow LR2b regarding the lens unit LR2 are loci of movement for correcting image plane variation accompanying magnification varying when the zoom lens is focused on infinity and close distance, respectively. Further, focusing from infinity to close distance is performed by moving the lens unit LR2 toward the object side as indicated by an arrow LR2c.

A solid arrow LN2a and a dotted arrow LN2b regarding the lens unit LN2 are loci of movement for correcting image plane variation accompanying magnification varying when the zoom lens is focused on infinity and close distance, respectively. Further, focusing from infinity to close distance is performed by moving the lens unit LN2 toward the image side as indicated by an arrow LN2c.

In the lens cross-sectional views in Embodiment 3, the front lens group LF consists of a lens unit having a positive refractive power. The zoom lens includes a lens unit LN1 having a negative refractive power, and a rear lens group LR. The rear lens group LR consists of, in order from the object side to the image side, a lens unit LR1 having a positive refractive power, a lens unit LR2 having a positive refractive power, a lens unit LN2 having a negative refractive power, and a lens unit LN3 having a negative refractive power. The zoom lens according to Embodiment 3 is a six-unit zoom lens. In Embodiment 3, all the lens units are configured to move during zooming.

A solid arrow LN2a and a dotted arrow LN2b regarding the lens unit LR2 are loci of movement for correcting image plane variation accompanying magnification varying when the zoom lens is focused on infinity and close distance, respectively. Further, focusing from infinity to close distance is performed by moving the lens unit LN2 toward the image side as indicated by an arrow LN2c.

In the lens cross-sectional views in Embodiment 4, the front lens group LF consists of a lens unit LP1 having a positive refractive power and a lens unit LP2 having a positive refractive power. That is, the lens unit LP2 having a positive refractive power is arranged between the lens unit LP1 and the lens unit LN1. The zoom lens includes the lens unit LN1 having a negative refractive power, and a rear lens group LR. The rear lens group LR consists of, in order from the object side to the image side, a lens unit LR1 having a positive refractive power, a lens unit LR2 having a negative refractive power, a lens unit LR3 having a positive refractive power, a lens unit LN2 having a negative refractive power, and a lens unit LN3 having a negative refractive power.

The zoom lens according to Embodiment 4 is an eight-unit zoom lens. In Embodiment 4, the lens unit LR1 is configured not to move during zooming, and the other lens units are configured to move during zooming.

A solid arrow LR2a and a dotted arrow LR2b regarding the lens unit LR2 are loci of movement for correcting image plane variation accompanying magnification varying when the zoom lens is focused on infinity and close distance, respectively. Further, focusing from infinity to close distance is performed by moving the lens unit LR2 toward the object side as indicated by an arrow LR2c.

A solid arrow LN2a and a dotted arrow LN2b regarding the lens unit LN2 are loci of movement for correcting image plane variation accompanying magnification varying when the zoom lens is focused on infinity and close distance, respectively. Further, focusing from infinity to close distance is performed by moving the lens unit LN2 toward the image side as indicated by an arrow LN2c.

Next, a digital still camera (image pickup apparatus) according to one embodiment of the disclosure, which uses the zoom lens according to each Embodiment of the disclosure as an image pickup optical system, is described with reference to FIG. 15.

The image pickup apparatus includes a camera main body 10 and an image pickup optical system 11 including the zoom lens according to each Embodiment. An image pickup element 12 (photoelectric conversion element) is built into the camera main body 10, and is a CCD sensor, a CMOS sensor, or other such element configured to receive an object image formed by the image pickup optical system 11.

Next, numerical data sets 1 to 7 corresponding to Embodiments 1 to 7 of the disclosure, respectively, are shown. In each numerical data set, the order of an optical surface from the object side is represented by "i". A curvature radius of the i-th optical surface (i-th surface) is represented by "ri", and an interval between the i-th surface and the (i+1)th surface is represented by "di". A refractive index and an Abbe number of a material of an optical member between the i-th surface and the (i+1)th surface with respect to the d-line are represented by "ndi" and "vdi", respectively. An Abbe number "vd" of a material is represented by: vd=(Nd−1)/(NF−NC), where Ng, NF, Nd, and NC represent refractive indices of a material with respect to the g-line (wavelength: 435.8 nm), the F-line (wavelength: 486.1 nm), the d-line (wavelength: 587.6 nm), and the C-line (wavelength: 656.3 nm), respectively.

A back focus BF is a distance from the last lens surface to a paraxial image plane in an air-equivalent length. The total length of the zoom lens is a length obtained by adding the value of the back focus BF to the length from the first lens surface to the last lens surface.

An asterisk "*" affixed to the right of a surface number means an aspherical surface. In addition, an eccentricity is represented by "k". Aspherical coefficients are represented by A4, A6, A8, A10, and A12. A displacement in the optical axis direction at a position of a height "h" from the optical axis with respect to a surface apex is represented by "x". At this time, an aspherical shape is expressed by the following expression.

$$x=(h^2/R)/[1+\{1-(1+k)(h/R)2\}^{1/2}]+A4 \times h4+A6 \times h6+A8 \times h8+A10 \times h10+A12 \times h12$$

In this expression, R represents a paraxial curvature radius. The notation "e-x" means "×10⁻ˣ". Correspondence between each of the above-mentioned conditional expressions and a parameter in each set of numerical data is shown in Table 1.

[Numerical Data 1]

Surface data

| Surface number | r | d | nd | vd |
|---|---|---|---|---|
| 1 | 100.939 | 7.87 | 1.49700 | 81.5 |
| 2 | 607.683 | 0.20 | | |
| 3 | 110.004 | 2.70 | 1.61340 | 44.3 |
| 4 | 53.490 | 0.10 | | |
| 5 | 53.730 | 12.43 | 1.43875 | 94.7 |
| 6 | 3,390.259 | (Variable) | | |
| 7 | −1,019.669 | 1.40 | 1.59522 | 67.7 |
| 8 | 67.179 | 3.69 | | |
| 9 | −87.581 | 1.40 | 1.76385 | 48.5 |
| 10 | 46.336 | 4.29 | 1.85478 | 24.8 |
| 11 | 332.483 | (Variable) | | |
| 12 (Stop) | ∞ | 0.50 | | |
| 13* | 55.423 | 7.62 | 1.49700 | 81.5 |
| 14 | −81.526 | (Variable) | | |
| 15 | −35.517 | 1.50 | 1.59270 | 35.3 |
| 16 | 67.830 | 4.02 | 1.84666 | 23.8 |
| 17 | −152.316 | (Variable) | | |
| 18 | 135.330 | 1.50 | 2.05090 | 26.9 |
| 19 | 38.052 | 8.70 | 1.49700 | 81.5 |
| 20 | −40.283 | 1.06 | | |
| 21 | −31.420 | 1.50 | 1.90043 | 37.4 |
| 22 | −42.308 | 0.20 | | |
| 23 | 77.449 | 7.14 | 1.48749 | 70.2 |
| 24 | −50.845 | 0.20 | | |
| 25 | 54.910 | 4.18 | 1.72916 | 54.7 |
| 26 | 361.257 | (Variable) | | |
| 27 | 122.370 | 1.10 | 1.59349 | 67.0 |
| 28 | 25.095 | (Variable) | | |
| 29 | −113.404 | 3.48 | 1.85478 | 24.8 |
| 30 | −46.768 | 6.58 | | |
| 31* | −23.188 | 2.00 | 1.58313 | 59.4 |
| 32* | −73.788 | (Variable) | | |
| Image plane | ∞ | | | |

Aspherical surface data

Thirteenth surface

K = 0.00000e+000    A4 = −1.02194e−006    A6 = 1.17568e−009
A8 = 3.55948e−013

Thirty-first surface

K = −9.20301e−001    A4 = 3.85280e−006    A6 = −4.23759e−009
A8 = 2.33288e−011    A10 = −5.19248e−014

Thirty-second surface

K = 0.00000e+000    A4 = −7.12420e−007    A6 = −2.81460e−009
A8 = 8.93827e−012    A10 = −2.50517e−014

Various data
Zoom ratio 2.70

| | Wide angle | Intermediate | Telephoto |
|---|---|---|---|
| Focal length | 72.10 | 117.20 | 194.99 |
| F-number | 2.89 | 2.89 | 2.89 |
| Half angle of view (degrees) | 16.70 | 10.46 | 6.33 |
| Image height | 21.64 | 21.64 | 21.64 |
| Total lens length | 163.23 | 198.76 | 223.25 |
| BF | 13.34 | 21.32 | 29.07 |
| d6 | 6.26 | 41.78 | 66.27 |
| d11 | 9.28 | 7.16 | 2.33 |
| d14 | 9.26 | 12.59 | 16.02 |
| d17 | 7.95 | 4.62 | 1.18 |
| d26 | 13.85 | 8.82 | 1.36 |
| d28 | 17.93 | 17.11 | 21.65 |
| d32 | 13.34 | 21.32 | 29.07 |

Zoom lens unit data

| Unit | First surface | Focal length |
|---|---|---|
| 1 | 1 | 159.29 |
| 2 | 7 | −52.04 |
| 3 | 12 | 67.63 |
| 4 | 15 | −141.19 |
| 5 | 18 | 37.31 |
| 6 | 27 | −53.42 |
| 7 | 29 | −195.48 |

[Numerical Data 2]

Surface data

| Surface number | r | d | nd | vd |
|---|---|---|---|---|
| 1 | 92.123 | 7.60 | 1.53775 | 74.7 |
| 2 | 395.909 | 0.20 | | |
| 3 | 104.477 | 2.80 | 1.61340 | 44.3 |
| 4 | 50.193 | 0.10 | | |
| 5 | 50.367 | 13.35 | 1.43387 | 95.1 |
| 6 | 2,020.071 | (Variable) | | |
| 7 | −541.600 | 1.60 | 1.76385 | 48.5 |
| 8 | 63.772 | 3.76 | | |
| 9 | −70.848 | 1.40 | 1.59522 | 67.7 |
| 10 | 66.960 | 3.06 | 1.85478 | 24.8 |
| 11 | 532.626 | (Variable) | | |
| 12 (Stop) | ∞ | 0.50 | | |
| 13* | 45.242 | 7.06 | 1.49700 | 81.5 |
| 14* | −75.602 | (Variable) | | |
| 15 | −32.197 | 1.50 | 1.54072 | 47.2 |
| 16 | 53.953 | 3.21 | 1.84666 | 23.8 |
| 17 | 569.160 | (Variable) | | |
| 18 | 162.344 | 3.95 | 1.59349 | 67.0 |

-continued

| | | | | |
|---|---|---|---|---|
| 19 | −60.414 | 0.15 | | |
| 20 | 304.624 | 1.60 | 2.05090 | 26.9 |
| 21 | 32.443 | 7.52 | 1.49700 | 81.5 |
| 22 | −79.721 | 0.15 | | |
| 23 | 43.634 | 4.50 | 1.59551 | 39.2 |
| 24 | 393.600 | 0.15 | | |
| 25 | 62.576 | 4.15 | 1.59349 | 67.0 |
| 26 | −376.353 | (Variable) | | |
| 27 | 160.904 | 1.10 | 1.59522 | 67.7 |
| 28 | 24.260 | (Variable) | | |
| 29 | −255.241 | 3.39 | 1.85478 | 24.8 |
| 30 | −61.402 | 3.68 | | |
| 31* | −24.292 | 2.00 | 1.49700 | 81.5 |
| 32* | −86.058 | (Variable) | | |
| Image plane | ∞ | | | |

Aspherical surface data

Thirteenth surface

K = 0.00000e+000   A4 = −1.53384e−006   A6 = −6.47368e−011
A8 = 1.02903e−012   A10 = 1.95023e−014

Fourteenth surface

K = 0.00000e+000   A4 = 2.54451e−008   A6 = −2.08371e−009
A8 = 6.96900e−012   A10 = 6.62087e−015

Thirty-first surface

K = −1.53025e+000   A4 = −3.08663e−006   A6 = 1.48626e−008
A8 = −5.30224e−011   A10 = 5.71026e−014

Thirty-second surface

K = 0.00000e+000   A4 = −4.22388e−006   A6 = 9.26149e−009
A8 = −3.61802e−011   A10 = 3.18024e−014

Various data
Zoom ratio 2.70

| | Wide angle | Intermediate | Telephoto |
|---|---|---|---|
| Focal length | 72.10 | 118.53 | 194.99 |
| F-number | 2.89 | 2.89 | 2.89 |
| Half angle of view (degrees) | 16.70 | 10.34 | 6.33 |
| Image height | 21.64 | 21.64 | 21.64 |
| Total lens length | 163.23 | 186.33 | 206.73 |
| BF | 13.16 | 19.13 | 22.74 |
| d6 | 4.31 | 38.33 | 65.15 |
| d11 | 19.53 | 8.61 | 2.19 |
| d14 | 8.25 | 9.68 | 12.28 |
| d17 | 5.19 | 3.76 | 1.16 |
| d26 | 11.57 | 8.99 | 0.99 |
| d28 | 22.75 | 19.36 | 23.75 |
| d32 | 13.16 | 19.13 | 22.74 |

Zoom lens unit data

| Unit | First surface | Focal length |
|---|---|---|
| 1 | 1 | 151.76 |
| 2 | 7 | −50.37 |
| 3 | 12 | 58.08 |
| 4 | 15 | −79.55 |
| 5 | 18 | 35.52 |
| 6 | 27 | −48.14 |
| 7 | 29 | −288.19 |

[Numerical Data 3]

Surface data

| Surface number | r | d | nd | vd |
|---|---|---|---|---|
| 1 | 113.172 | 7.56 | 1.59522 | 67.7 |
| 2 | 1,056.983 | 0.20 | | |
| 3 | 102.105 | 2.70 | 1.61340 | 44.3 |
| 4 | 51.784 | 10.83 | 1.43875 | 94.7 |
| 5 | 253.046 | (Variable) | | |
| 6 | 237.089 | 1.40 | 1.59282 | 68.6 |
| 7 | 39.178 | 6.19 | | |
| 8 | −85.365 | 1.40 | 1.70416 | 37.8 |
| 9 | 53.194 | 4.16 | 1.85478 | 24.8 |
| 10 | 1,078.556 | (Variable) | | |
| 11 (Stop) | ∞ | 1.00 | | |
| 12 | 53.866 | 4.27 | 2.00077 | 26.1 |
| 13 | 538.275 | 1.08 | | |
| 14 | 71.958 | 1.40 | 1.85685 | 40.2 |
| 15 | 22.692 | 10.52 | 1.49691 | 81.6 |
| 16 | −82.495 | 2.01 | | |
| 17 | −37.108 | 1.40 | 1.77057 | 32.8 |
| 18 | 140.883 | 0.15 | | |
| 19 | 39.570 | 5.20 | 1.81896 | 24.8 |
| 20 | 407.027 | (Variable) | | |
| 21 | 351.705 | 1.40 | 2.05109 | 26.9 |
| 22 | 30.854 | 9.91 | 1.52384 | 77.4 |
| 23 | −52.724 | 0.09 | | |
| 24 | 123.194 | 3.52 | 1.72969 | 54.7 |
| 25 | −119.076 | 0.20 | | |
| 26 | 52.826 | 4.71 | 1.72956 | 54.7 |
| 27 | −282.122 | (Variable) | | |
| 28* | 223.534 | 1.10 | 1.55332 | 71.7 |
| 29* | 22.184 | (Variable) | | |
| 30 | −63.362 | 3.36 | 1.85478 | 24.8 |
| 31 | −35.968 | 10.73 | | |
| 32* | −20.032 | 2.00 | 1.55332 | 71.7 |
| 33* | −42.741 | (Variable) | | |
| Image plane | ∞ | | | |

Aspherical surface data

Twenty-eighth surface

K = 0.00000e+000   A4 = 5.18853e−006   A6 = −7.31532e−009
A8 = 9.88642e−012   A10 = −9.60351e−015

Twenty-ninth surface

K = 0.00000e+000   A4 = 4.82149e−006   A6 = 4.51882e−010
A8 = 1.78331e−011   A10 = −2.21788e−014

Thirty-second surface

K = −1.12051e+000   A4 = 1.07692e−005   A6 = 1.38612e−008
A8 = 4.46577e−012   A10 = −5.05179e−015

Thirty-third surface

K = 0.00000e+000   A4 = 1.09708e−005   A6 = −3.53804e−011
A8 = 1.27312e−011   A10 = −2.70651e−014

Various data
Zoom ratio 2.70

| | Wide angle | Intermediate | Telephoto |
|---|---|---|---|
| Focal length | 72.10 | 119.18 | 194.96 |
| F-number | 2.89 | 2.89 | 2.89 |
| Half angle of view (degrees) | 16.70 | 10.29 | 6.33 |
| Image height | 21.64 | 21.64 | 21.64 |
| Total lens length | 163.92 | 201.30 | 231.07 |
| BF | 12.94 | 24.20 | 35.77 |
| d5 | 4.54 | 41.92 | 71.68 |
| d10 | 10.80 | 6.26 | 2.08 |
| d20 | 7.41 | 4.76 | 1.92 |
| d27 | 10.35 | 6.22 | 0.89 |
| d29 | 19.40 | 19.47 | 20.24 |
| d33 | 12.94 | 24.20 | 35.77 |

Zoom lens unit data

| Unit | First surface | Focal length |
|---|---|---|
| 1 | 1 | 173.19 |
| 2 | 6 | −51.88 |
| 3 | 11 | 80.10 |

-continued

| | | |
|---|---|---|
| 4 | 21 | 36.49 |
| 5 | 28 | −44.60 |
| 6 | 30 | −447.67 |

[Numerical Data 4]

Surface data

| Surface number | r | d | nd | vd |
|---|---|---|---|---|
| 1 | 145.690 | 5.95 | 1.49700 | 81.5 |
| 2 | 1,174.327 | 0.20 | | |
| 3 | 106.850 | 2.80 | 1.61340 | 44.3 |
| 4 | 50.142 | 12.96 | 1.49700 | 81.5 |
| 5 | 438.729 | (Variable) | | |
| 6 | 432.945 | 3.83 | 1.43875 | 94.7 |
| 7 | −138.915 | (Variable) | | |
| 8 | −279.789 | 1.50 | 1.76385 | 48.5 |
| 9 | 51.929 | 5.07 | | |
| 10 | −49.025 | 1.40 | 1.59522 | 67.7 |
| 11 | 72.680 | 3.63 | 1.85478 | 24.8 |
| 12 | −443.886 | (Variable) | | |
| 13 (Stop) | ∞ | 0.50 | | |
| 14* | 41.255 | 7.15 | 1.49700 | 81.5 |
| 15* | −107.262 | (Variable) | | |
| 16 | −32.473 | 1.50 | 1.58144 | 40.8 |
| 17 | 73.853 | 3.49 | 1.84666 | 23.8 |
| 18 | −412.099 | (Variable) | | |
| 19 | 264.084 | 4.50 | 1.59349 | 67.0 |
| 20 | −53.974 | 0.15 | | |
| 21 | 138.806 | 1.60 | 2.05090 | 26.9 |
| 22 | 32.740 | 7.36 | 1.48749 | 70.2 |
| 23 | −123.088 | 0.15 | | |
| 24 | 51.513 | 3.92 | 1.63930 | 44.9 |
| 25 | 420.279 | 0.15 | | |
| 26 | 61.977 | 4.50 | 1.58913 | 61.1 |
| 27 | 4,216.117 | (Variable) | | |
| 28 | 104.752 | 1.10 | 1.53775 | 74.7 |
| 29 | 25.523 | (Variable) | | |
| 30 | −104.342 | 2.63 | 1.85478 | 24.8 |
| 31 | −55.180 | 3.62 | | |
| 32* | −23.853 | 2.00 | 1.55332 | 71.7 |
| 33* | −51.260 | (Variable) | | |
| Image plane | ∞ | | | |

Aspherical surface data

Fourteenth surface

K = 0.00000e+000  A4 = −2.70392e−006  A6 = 5.64875e−010
A8 = 3.12298e−012  A10 = −1.53401e−014

Fifteenth surface

K = 0.00000e+000  A4 = −1.08720e−006  A6 = 5.29694e−010
A8 = −1.95272e−013  A10 = −1.14169e−014

Thirty-second surface

K = −1.01793e+000  A4 = −6.59724e−006  A6 = 5.55822e−008
A8 = −1.95516e−010  A10 = 2.56079e−013

Thirty-third surface

K = 0.00000e+000  A4 = −7.31259e−006  A6 = 4.38949e−008
A8 = −1.39962e−010  A10 = 1.60264e−013

Various data
Zoom ratio 2.70

| | Wide angle | Intermediate | Telephoto |
|---|---|---|---|
| Focal length | 72.10 | 119.02 | 195.00 |
| F-number | 2.89 | 2.89 | 2.89 |
| Half angle of view (degrees) | 16.70 | 10.30 | 6.33 |
| Image height | 21.64 | 21.64 | 21.64 |
| Total lens length | 171.47 | 207.72 | 222.30 |
| BF | 19.96 | 23.84 | 26.70 |

| | | | |
|---|---|---|---|
| d5 | 1.49 | 37.74 | 52.32 |
| d7 | 1.57 | 8.13 | 19.12 |
| d12 | 19.29 | 12.73 | 1.74 |
| d15 | 8.19 | 10.53 | 12.20 |
| d18 | 5.14 | 2.80 | 1.13 |
| d27 | 11.50 | 8.24 | 1.00 |
| d29 | 22.67 | 22.05 | 26.43 |
| d33 | 19.96 | 23.84 | 26.70 |

Zoom lens unit data

| Unit | First surface | Focal length |
|---|---|---|
| 1 | 1 | 186.47 |
| 2 | 6 | 240.19 |
| 3 | 8 | −40.86 |
| 4 | 13 | 60.92 |
| 5 | 16 | −82.59 |
| 6 | 19 | 37.53 |
| 7 | 28 | −63.06 |
| 8 | 30 | −221.28 |

[Numerical Data 5]

Surface data

| Surface number | r | d | nd | vd |
|---|---|---|---|---|
| 1 | 102.810 | 8.12 | 1.49700 | 81.5 |
| 2 | 962.108 | 0.20 | | |
| 3 | 99.499 | 2.70 | 1.61340 | 44.3 |
| 4 | 51.536 | 0.10 | | |
| 5 | 51.757 | 12.23 | 1.43875 | 94.7 |
| 6 | 877.113 | (Variable) | | |
| 7 | −405.163 | 1.40 | 1.59522 | 67.7 |
| 8 | 52.382 | 4.68 | | |
| 9 | −69.233 | 1.40 | 1.56732 | 42.8 |
| 10 | 57.110 | 3.79 | 1.85478 | 24.8 |
| 11 | 612.471 | (Variable) | | |
| 12 (Stop) | ∞ | 1.00 | | |
| 13 | 68.751 | 6.95 | 1.43875 | 94.7 |
| 14 | −54.332 | (Variable) | | |
| 15 | −39.079 | 1.50 | 1.81600 | 46.6 |
| 16 | 59.546 | 4.12 | 2.00069 | 25.5 |
| 17 | −202.953 | (Variable) | | |
| 18 | 119.989 | 1.40 | 1.84666 | 23.8 |
| 19 | 62.710 | 0.15 | | |
| 20 | 36.102 | 9.03 | 1.48749 | 70.2 |
| 21 | −41.910 | 1.40 | 1.66680 | 33.0 |
| 22 | 64.800 | 0.15 | | |
| 23 | 36.722 | 9.32 | 1.48749 | 70.2 |
| 24 | −66.620 | 0.15 | | |
| 25* | 38.106 | 6.80 | 1.58313 | 59.4 |
| 26* | −110.952 | (Variable) | | |
| 27 | 101.192 | 2.37 | 1.80518 | 25.4 |
| 28 | 474.008 | 1.20 | 1.80400 | 46.5 |
| 29 | 24.082 | (Variable) | | |
| 30 | −307.903 | 1.60 | 1.76385 | 48.5 |
| 31 | 36.156 | 10.16 | 1.72047 | 34.7 |
| 32 | −50.316 | 4.56 | | |
| 33* | −20.989 | 2.00 | 1.58913 | 61.1 |
| 34* | −56.517 | (Variable) | | |
| Image plane | ∞ | | | |

Aspherical surface data

Twenty-fifth surface

K = 0.00000e+000  A4 = −4.96331e−006  A6 = −6.79898e−009
A8 = 6.89175e−013  A10 = −1.69107e−014

Twenty-sixth surface

K = 0.00000e+000  A4 = 6.32053e−006  A6 = −5.35102e−009
A8 = 9.97561e−012  A10 = −5.18592e−015

-continued

Thirty-third surface

K = −6.95822e−001    A4 = 2.64840e−006    A6 = −3.73518e−009
A8 = 2.19530e−011    A10 = −9.36425e−014

Thirty-fourth surface

K = 0.00000e+000    A4 = −7.49418e−006    A6 = 2.68983e−009
A8 = −6.11648e−012    A10 = −2.13251e−014

Various data
Zoom ratio 2.70

| | Wide angle | Intermediate | Telephoto |
|---|---|---|---|
| Focal length | 72.10 | 118.62 | 195.00 |
| F-number | 2.89 | 2.89 | 2.89 |
| Half angle of view (degrees) | 16.70 | 10.34 | 6.33 |
| Image height | 21.64 | 21.64 | 21.64 |
| Total lens length | 162.22 | 196.00 | 218.49 |
| BF | 9.50 | 15.17 | 20.51 |
| d6 | 6.17 | 39.95 | 62.44 |
| d11 | 7.46 | 5.69 | 2.18 |
| d14 | 6.45 | 9.59 | 12.63 |
| d17 | 7.57 | 4.43 | 1.39 |
| d26 | 11.52 | 7.30 | 1.00 |
| d29 | 15.07 | 15.39 | 19.86 |
| d34 | 9.50 | 15.17 | 20.51 |

Zoom lens unit data

| Unit | First surface | Focal length |
|---|---|---|
| 1 | 1 | 151.32 |
| 2 | 7 | −56.63 |
| 3 | 12 | 70.38 |
| 4 | 15 | −79.81 |
| 5 | 18 | 32.57 |
| 6 | 27 | −40.15 |
| 7 | 30 | −166.94 |

[Numerical Data 6]

Surface data

| Surface number | r | d | nd | vd |
|---|---|---|---|---|
| 1 | 85.090 | 7.09 | 1.49700 | 81.5 |
| 2 | 648.938 | 0.20 | | |
| 3 | 96.342 | 2.30 | 1.61340 | 44.3 |
| 4 | 48.182 | 0.10 | | |
| 5 | 48.446 | 9.55 | 1.43875 | 94.7 |
| 6 | 396.637 | (Variable) | | |
| 7 | 7,278.577 | 1.10 | 1.59522 | 67.7 |
| 8 | 51.556 | 3.17 | | |
| 9 | −67.171 | 1.10 | 1.76385 | 48.5 |
| 10 | 45.239 | 3.44 | 1.85478 | 24.8 |
| 11 | 586.447 | (Variable) | | |
| 12 (Stop) | ∞ | 0.50 | | |
| 13* | 38.811 | 6.38 | 1.49700 | 81.5 |
| 14 | −92.638 | (Variable) | | |
| 15 | −37.886 | 1.20 | 1.66235 | 33.0 |
| 16 | 106.371 | 2.67 | 1.84666 | 23.8 |
| 17 | −151.985 | (Variable) | | |
| 18 | 155.546 | 3.15 | 1.51742 | 52.4 |
| 19 | −64.875 | 0.15 | | |
| 20 | 779.190 | 1.20 | 2.05090 | 26.9 |
| 21 | 35.606 | 5.26 | 1.51742 | 52.4 |
| 22 | −87.387 | 0.15 | | |
| 23 | 63.730 | 3.28 | 1.51742 | 52.4 |
| 24 | −290.872 | 0.15 | | |
| 25 | 41.742 | 4.40 | 1.51742 | 52.4 |
| 26 | −419.385 | (Variable) | | |
| 27 | 154.181 | 1.00 | 1.59282 | 68.6 |
| 28 | 23.949 | (Variable) | | |
| 29 | −81.913 | 3.19 | 1.85478 | 24.8 |
| 30 | −38.811 | 6.77 | | |
| 31* | −20.043 | 1.80 | 1.58313 | 59.4 |
| 32* | −54.835 | (Variable) | | |
| Image plane | ∞ | | | |

Aspherical surface data

Thirteenth surface

K = 0.00000e+000    A4 = −2.82386e−006    A6 = 5.45386e−010
A8 = 2.61241e−013

Thirty-first surface

K = −6.85718e−001    A4 = 1.18463e−005    A6 = −4.36599e−008
A8 = 1.96981e−010    A10 = −3.56383e−013

Thirty-second surface

K = 0.00000e+000    A4 = 4.87876e−006    A6 = −3.64063e−008
A8 = 1.22101e−010    A10 = −1.89877e−013

Various data
Zoom ratio 3.36

| | Wide angle | Intermediate | Telephoto |
|---|---|---|---|
| Focal length | 72.10 | 131.78 | 242.00 |
| F-number | 4.10 | 4.10 | 4.10 |
| Half angle of view (degrees) | 16.70 | 9.32 | 5.11 |
| Image height | 21.64 | 21.64 | 21.64 |
| Total lens length | 147.22 | 176.39 | 210.90 |
| BF | 12.95 | 25.54 | 36.63 |
| d6 | 3.46 | 32.63 | 67.15 |
| d11 | 12.51 | 5.48 | 2.18 |
| d14 | 8.42 | 10.23 | 11.70 |
| d17 | 8.40 | 2.93 | 1.19 |
| d26 | 16.43 | 11.25 | 0.99 |
| d28 | 15.76 | 19.04 | 21.77 |
| d32 | 12.95 | 25.54 | 36.63 |

Zoom lens unit data

| Unit | First surface | Focal length |
|---|---|---|
| 1 | 1 | 147.67 |
| 2 | 7 | −44.01 |
| 3 | 12 | 55.94 |
| 4 | 15 | −100.39 |
| 5 | 18 | 37.71 |
| 6 | 27 | −47.96 |
| 7 | 29 | −195.15 |

[Numerical Data 7]

Surface data

| Surface number | r | d | nd | vd |
|---|---|---|---|---|
| 1 | 83.619 | 5.07 | 1.59349 | 67.0 |
| 2 | 477.088 | 0.20 | | |
| 3 | 94.318 | 2.00 | 1.65412 | 39.7 |
| 4 | 44.281 | 7.13 | 1.49700 | 81.5 |
| 5 | 222.372 | (Variable) | | |
| 6 | 1,259.011 | 1.10 | 1.72916 | 54.7 |
| 7 | 78.807 | 1.32 | | |
| 8 | −113.995 | 1.10 | 1.77250 | 49.6 |
| 9 | 33.312 | 2.40 | 1.85478 | 24.8 |
| 10 | 99.141 | (Variable) | | |
| 11 (Stop) | ∞ | 0.50 | | |
| 12 | 37.066 | 3.64 | 1.53775 | 74.7 |
| 13 | −116.530 | (Variable) | | |
| 14 | −27.627 | 1.20 | 1.72825 | 28.5 |

-continued

| | | | | |
|---|---|---|---|---|
| 15 | 33.492 | 3.51 | 1.92119 | 24.0 |
| 16 | −78.748 | (Variable) | | |
| 17 | −2,860.926 | 2.89 | 1.51633 | 64.1 |
| 18 | −29.644 | 0.15 | | |
| 19 | 81.848 | 4.26 | 1.51742 | 52.4 |
| 20 | −24.495 | 1.20 | 2.05090 | 26.9 |
| 21 | 63.979 | 0.87 | | |
| 22 | 520.261 | 2.46 | 1.69895 | 30.1 |
| 23 | −47.925 | 0.15 | | |
| 24 | 41.136 | 3.37 | 1.72047 | 34.7 |
| 25 | −147.384 | (Variable) | | |
| 26 | 1,790.920 | 2.12 | 1.80810 | 22.8 |
| 27 | −60.946 | 1.00 | 1.80400 | 46.5 |
| 28 | 30.204 | (Variable) | | |
| 29 | −102.729 | 1.20 | 1.49700 | 81.5 |
| 30 | 53.334 | 5.63 | 1.61340 | 44.3 |
| 31 | −65.106 | 3.37 | | |
| 32* | −29.146 | 1.80 | 1.49700 | 81.5 |
| 33* | −118.468 | (Variable) | | |
| Image plane | ∞ | | | |

Aspherical surface data

Thirty-second surface

K = 1.52417e+000  A4 = −1.16506e−005  A6 = 2.03132e−008
A8 = 1.48328e−010  A10 = −1.42916e−013

Thirty-third surface

K = 0.00000e+000  A4 = −2.24227e−005  A6 = 1.64688e−008
A8 = 6.39811e−011  A10 = −1.79580e−013

Various data
Zoom ratio 4.01

| | Wide angle | Intermediate | Telephoto |
|---|---|---|---|
| Focal length | 72.10 | 144.31 | 289.00 |
| F-number | 4.60 | 5.68 | 5.88 |
| Half angle of view (degrees) | 16.70 | 8.53 | 4.28 |
| Image height | 21.64 | 21.64 | 21.64 |
| Total lens length | 136.41 | 169.48 | 201.14 |
| BF | 12.95 | 28.75 | 42.22 |
| d5 | 2.89 | 35.97 | 67.62 |
| d10 | 18.49 | 9.43 | 1.61 |
| d13 | 4.79 | 7.18 | 10.58 |
| d16 | 8.65 | 4.58 | 1.04 |
| d25 | 17.79 | 12.22 | 0.99 |
| d28 | 11.22 | 11.73 | 17.44 |
| d33 | 12.95 | 28.75 | 42.22 |

Zoom lens unit data

| Unit | First surface | Focal length |
|---|---|---|
| 1 | 1 | 139.02 |
| 2 | 6 | −45.57 |
| 3 | 11 | 52.73 |
| 4 | 14 | −122.80 |
| 5 | 17 | 40.98 |
| 6 | 26 | −38.35 |
| 7 | 29 | −173.06 |

TABLE 1

| | Conditional Expression 1 | Conditional Expression 2 | Conditional Expression 3 | Conditional Expression 4 | Conditional Expression 5 |
|---|---|---|---|---|---|
| Embodiment 1 | 1.026 | 1.236 | 0.116 | 0.308 | 2.178 |
| Embodiment 2 | 0.956 | 1.105 | 0.000 | 0.223 | 1.727 |
| Embodiment 3 | 0.860 | 1.037 | 0.130 | 0.344 | 2.763 |
| Embodiment 4 | 1.543 | 1.558 | 0.000 | 0.261 | 1.338 |
| Embodiment 5 | 0.709 | 1.435 | 0.094 | 0.289 | 2.159 |
| Embodiment 6 | 1.090 | 1.254 | 0.162 | 0.263 | 2.829 |
| Embodiment 7 | 0.842 | 1.213 | 0.261 | 0.224 | 3.261 |

TABLE 2

| | Conditional Expression 6 | Conditional Expression 7 | Conditional Expression 8 | Conditional Expression 9 |
|---|---|---|---|---|
| Embodiment 1 | −0.377 | 0.185 | −2.322 | 0.273 |
| Embodiment 2 | −0.287 | 0.183 | −2.888 | 0.167 |
| Embodiment 3 | −0.388 | 0.180 | −1.758 | 0.100 |
| Embodiment 4 | −0.273 | 0.277 | −2.554 | 0.285 |
| Embodiment 5 | −0.372 | 0.132 | −3.907 | 0.241 |
| Embodiment 6 | −0.431 | 0.180 | −2.201 | 0.246 |
| Embodiment 7 | −0.466 | 0.180 | −3.746 | 0.222 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-070653, filed Apr. 2, 2018, which is hereby incorporated by reference herein in its entirety.

What is claimed is:

1. A zoom lens comprising, in order from an object side to an image side:
a first lens unit having a positive refractive power;
a second lens unit having a negative refractive power; and
a rear lens group,
wherein an interval between each pair of adjacent lens units is changed during zooming,
wherein the rear lens group includes:
an object-side lens unit having a positive refractive power, which is arranged closest to the object side in the rear lens group;
a rear-side lens unit having a negative refractive power, which is arranged closest to the image side in the zoom lens; and
a middle lens unit having a negative refractive power, which is arranged adjacent to the rear-side lens unit and on the object side of the rear-side lens unit,
wherein the first lens unit, the middle lens unit, and the rear-side lens unit are configured to move toward the object side during zooming from a wide angle end to a telephoto end, wherein conditional expressions:

$0.50 < fn2/fn1 < 1.70;$ $1.01 < mn2/mn3 < 1.80;$ and $-0.01 < mr1/mp1 < 0.30,$ are satisfied where fn1 represents a focal length of the second lens unit, fn2 represents a focal length of the middle lens unit, mn2 represents a movement amount of the middle lens unit during zooming from the wide angle end to the telephoto end, mn3 represents a movement amount of the rear-side lens unit during zooming from the wide angle end to the telephoto end, mr1 represents a movement amount of the object-side lens unit during zooming from the wide angle end to the telephoto end, and mp1 represents a movement amount of the first lens unit during zooming from the wide angle end to the telephoto end.

2. The zoom lens according to claim 1, wherein a conditional expression:

$0.15 < mp1/ft < 0.40,$ is satisfied where ft represents a focal length of the zoom lens at the telephoto end.

3. The zoom lens according to claim 1, wherein a conditional expression:

$0.50 < skt/skw < 4.00,$ is satisfied where skw represents a back focus at the wide angle end, and skt represents a back focus at the telephoto end.

4. The zoom lens according to claim 1, wherein a conditional expression:

$-0.60 < fn1/ft < -0.20,$ is satisfied where ft represents a focal length of the zoom lens at the telephoto end.

5. The zoom lens according to claim 1, wherein a conditional expression:

$0.10 < skw/fw < 0.42,$ is satisfied where skw represents a back focus at the wide angle end, and fw represents a focal length of the zoom lens at the wide angle end.

6. The zoom lens according to claim 1, wherein a conditional expression:

$-5.00 < \beta LN1t < -1.00,$ is satisfied where $\beta LN1t$ represents a lateral magnification of the second lens unit at the telephoto end.

7. The zoom lens according to claim 1, wherein a conditional expression:

$0.05 < fn2/fn3 < 0.40,$ is satisfied where fn3 represents a focal length of the rear-side lens unit.

8. The zoom lens according to claim 1, wherein the middle lens unit is configured to move during focusing.

9. The zoom lens according to claim 1, wherein the rear lens group consists of, in order from the object side to the image side, the object-side lens unit, a lens unit having a negative refractive power, a lens unit having a positive refractive power, the middle lens unit, and the rear-side lens unit.

10. The zoom lens according to claim 9, wherein the lens unit having the negative refractive power is configured to move toward the object side during focusing from infinity to close distance, and the middle lens unit is configured to move toward the image side during focusing from infinity to close distance.

11. The zoom lens according to claim 1, wherein the rear lens group consists of, in order from the object side to the image side, the object-side lens unit, a lens unit having a positive refractive power, the middle lens unit, and the rear-side lens unit.

12. The zoom lens according to claim 11, wherein the middle lens unit is configured to move toward the image side during focusing from infinity to close distance.

13. The zoom lens according to claim 1, further comprising a lens unit having a positive refractive power, which is arranged between the first lens unit and the second lens unit.

14. The zoom lens according to claim 1, wherein the first lens unit is arranged closest to the object side in the zoom lens.

15. The zoom lens according to claim 1, wherein the rear lens group is arranged adjacent to the second lens unit and on the image side of the second lens unit, and includes an aperture stop.

16. An image pickup apparatus comprising:
a zoom lens; and
an image pickup element configured to receive an image formed by the zoom lens,
wherein the zoom lens includes, in order from an object side to an image side:
a first lens unit having a positive refractive power;
a second lens unit having a negative refractive power; and
a rear lens group,
wherein an interval between each pair of adjacent lens units is changed during zooming,
wherein the rear lens group includes:
an object-side lens unit having a positive refractive power, which is arranged closest to the object side in the rear lens group;
a rear-side lens unit having a negative refractive power, which is arranged closest to the image side in the zoom lens; and
a middle lens unit having a negative refractive power, which is arranged adjacent to the rear-side lens unit and on the object side of the rear-side lens unit,
wherein the first lens unit, the middle lens unit, and the rear-side lens unit are configured to move toward the object side during zooming from a wide angle end to a telephoto end, and
wherein conditional expressions:

$0.50 < fn2/fn1 < 1.70;$ $1.01 < mn2/mn3 < 1.80;$ and $-0.01 < mr1/mp1 < 0.30,$ are satisfied where fn1 represents a focal length of the second lens unit, fn2 represents a focal length of the middle lens unit, mn2 represents a movement amount of the middle lens unit during zooming from the wide angle end to the telephoto end, mn3 represents a movement amount of the rear-side lens unit during zooming from the wide angle end to the telephoto end, mr1 represents a movement amount of the object-side lens unit during zooming from the wide angle end to the telephoto end, and mp1 represents a movement amount of the first lens unit during zooming from the wide angle end to the telephoto end.

* * * * *